(12) United States Patent
Wexler et al.

(10) Patent No.: US 10,326,922 B2
(45) Date of Patent: Jun. 18, 2019

(54) WEARABLE APPARATUS AND METHOD FOR CAPTURING IMAGE DATA USING MULTIPLE IMAGE SENSORS

(71) Applicant: ORCAM TECHNOLOGIES LTD., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

(*) Notice: Subject to any disclaimer, the term of this patent is extended or adjusted under 35 U.S.C. 154(b) by 104 days.

(21) Appl. No.: 14/807,237

(22) Filed: Jul. 23, 2015

(65) Prior Publication Data

US 2016/0026867 A1    Jan. 28, 2016

Related U.S. Application Data

(60) Provisional application No. 62/027,936, filed on Jul. 23, 2014, provisional application No. 62/027,957, filed on Jul. 23, 2014.

(51) Int. Cl.
*G06K 9/00* (2006.01)
*H04N 5/225* (2006.01)
(Continued)

(52) U.S. Cl.
CPC ......... *H04N 5/2259* (2013.01); *G01S 3/7864* (2013.01); *G02B 27/0093* (2013.01); *G02B 27/017* (2013.01); *G06F 1/163* (2013.01); *G06F 1/1686* (2013.01); *G06F 1/18* (2013.01); *G06F 1/188* (2013.01); *G06F 3/005* (2013.01);
(Continued)

(58) Field of Classification Search
CPC . G02B 27/0093; G06F 1/1686; G06F 3/0304; G06F 17/30277; H04N 5/23206; H04N 5/2259; H04N 5/2254; H04N 5/23258; H04N 5/2258; H04N 5/23219;
(Continued)

(56) References Cited

U.S. PATENT DOCUMENTS

2002/0101513 A1* 8/2002 Halverson ............... H04N 5/772
                                                       348/207.99
2009/0226035 A1* 9/2009 Iihoshi ............... G06K 9/00234
                                                       382/103
(Continued)

*Primary Examiner* — Andrew M Moyer
(74) *Attorney, Agent, or Firm* — Finnegan, Henderson, Farabow, Garrett & Dunner, LLP

(57) ABSTRACT

A wearable apparatus and method are provided for capturing image data. In one implementation, a wearable apparatus for capturing image data is provided. The wearable apparatus includes a plurality of image sensors for capturing image data of an environment of a user. Each of the image sensors is associated with a different field of view. The wearable apparatus also includes a processing device programmed to process image data captured by at least two of the image sensors to identify an object in the environment. The processing device is also programmed to identify a first image sensor, which has a first optical axis closer to the object than a second optical axis of a second image sensor. After identifying the first image sensor, the processing device is also programmed to process image data from the first image sensor using a first processing scheme, and process image data from the second image sensor using a second processing scheme.

27 Claims, 20 Drawing Sheets

(51) Int. Cl.

| | |
|---|---|
| G06F 1/18 | (2006.01) |
| G06F 16/532 | (2019.01) |
| G02B 27/00 | (2006.01) |
| G02B 27/01 | (2006.01) |
| G06F 3/01 | (2006.01) |
| G06Q 30/02 | (2012.01) |
| H04N 5/232 | (2006.01) |
| H04N 7/18 | (2006.01) |
| G06F 1/16 | (2006.01) |
| G06F 3/00 | (2006.01) |
| G06F 3/038 | (2013.01) |
| H04N 5/235 | (2006.01) |
| G06T 7/20 | (2017.01) |
| H04N 5/44 | (2011.01) |
| G01S 3/786 | (2006.01) |
| H04N 1/21 | (2006.01) |
| G06K 9/62 | (2006.01) |
| G06F 3/03 | (2006.01) |
| G06T 7/00 | (2017.01) |
| G06T 7/73 | (2017.01) |
| G06F 16/53 | (2019.01) |
| G06F 16/51 | (2019.01) |

(52) U.S. Cl.
CPC ............. *G06F 3/011* (2013.01); *G06F 3/012* (2013.01); *G06F 3/017* (2013.01); *G06F 3/0304* (2013.01); *G06F 3/038* (2013.01); *G06F 16/51* (2019.01); *G06F 16/53* (2019.01); *G06F 16/532* (2019.01); *G06K 9/00201* (2013.01); *G06K 9/00208* (2013.01); *G06K 9/00221* (2013.01); *G06K 9/00288* (2013.01); *G06K 9/00335* (2013.01); *G06K 9/00624* (2013.01); *G06K 9/00671* (2013.01); *G06K 9/00677* (2013.01); *G06K 9/00718* (2013.01); *G06K 9/6262* (2013.01); *G06Q 30/0246* (2013.01); *G06Q 30/0257* (2013.01); *G06Q 30/0267* (2013.01); *G06Q 30/0269* (2013.01); *G06T 7/20* (2013.01); *G06T 7/74* (2017.01); *G06T 7/97* (2017.01); *H04N 1/2112* (2013.01); *H04N 5/2251* (2013.01); *H04N 5/2252* (2013.01); *H04N 5/2254* (2013.01); *H04N 5/2257* (2013.01); *H04N 5/2258* (2013.01); *H04N 5/2353* (2013.01); *H04N 5/23206* (2013.01); *H04N 5/23216* (2013.01); *H04N 5/23219* (2013.01); *H04N 5/23229* (2013.01); *H04N 5/23245* (2013.01); *H04N 5/23258* (2013.01); *H04N 5/44* (2013.01); *H04N 7/183* (2013.01); *H04N 7/185* (2013.01); *G02B 2027/014* (2013.01); *G02B 2027/0138* (2013.01); *G02B 2027/0178* (2013.01); *G02B 2027/0187* (2013.01); *G06F 2203/011* (2013.01); *G06K 2209/21* (2013.01); *G06K 2209/25* (2013.01); *G06T 2207/10004* (2013.01); *G06T 2207/10016* (2013.01); *G06T 2207/30232* (2013.01)

(58) Field of Classification Search
CPC ..... G06T 7/0022; G06T 7/20; G06K 9/00677; G06K 9/00288
USPC .......................................................... 382/154
See application file for complete search history.

(56) References Cited

U.S. PATENT DOCUMENTS

| | | | |
|---|---|---|---|
| 2010/0189175 A1* | 7/2010 | Fujii | H04N 19/126 375/240.03 |
| 2011/0069189 A1* | 3/2011 | Venkataraman | H01L 27/14618 348/218.1 |
| 2013/0336519 A1* | 12/2013 | Connor | G06K 9/00771 382/100 |
| 2014/0146172 A1* | 5/2014 | Kajitani | H04N 7/18 348/143 |
| 2014/0247124 A1* | 9/2014 | Ros | G08B 15/004 340/539.11 |

* cited by examiner

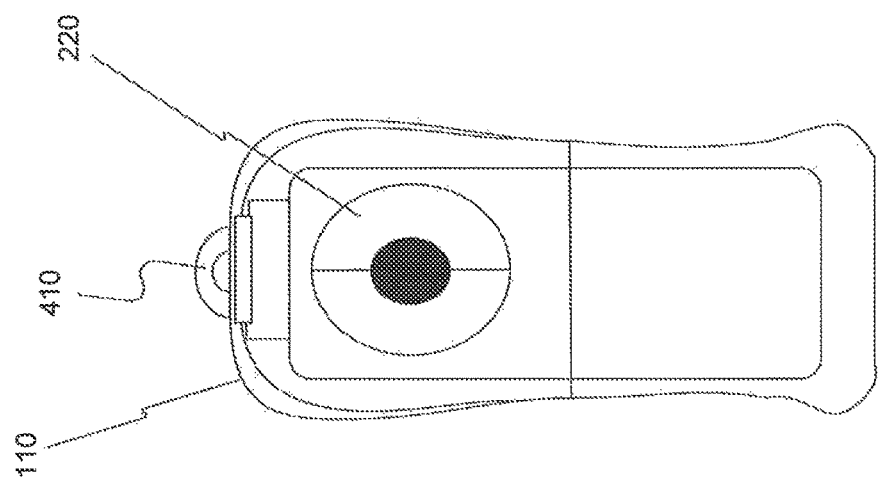

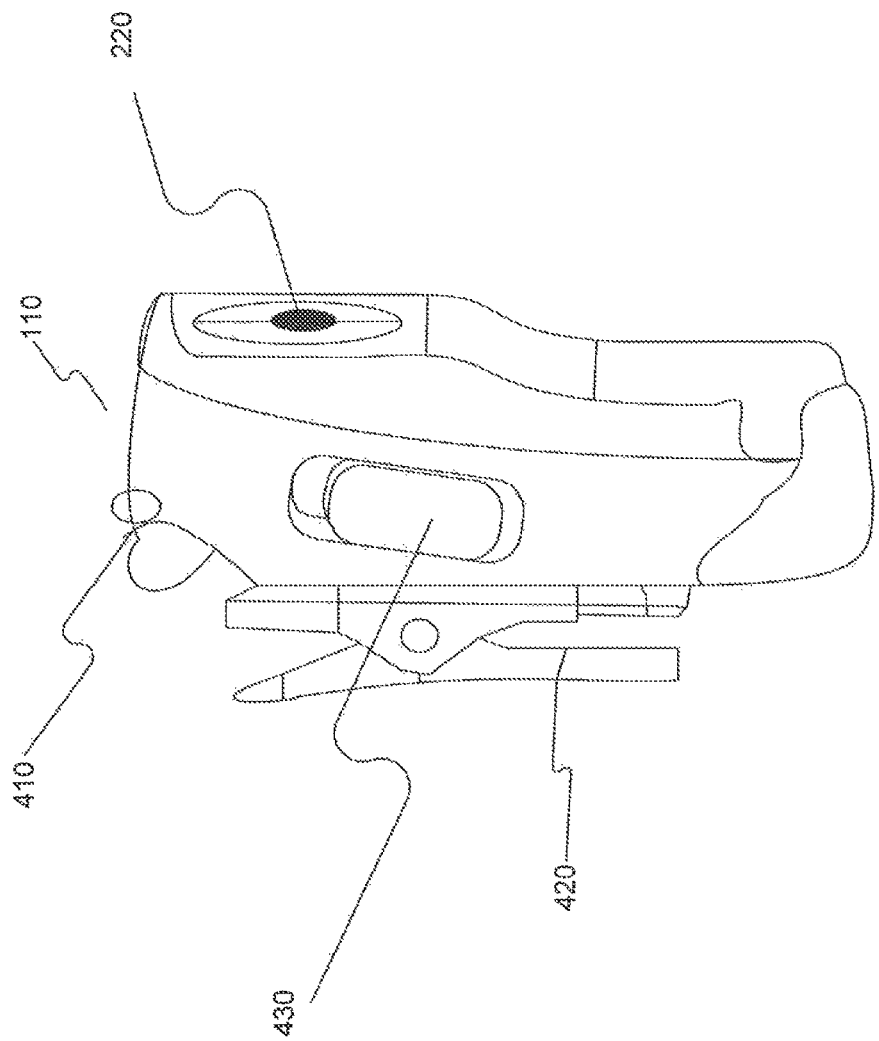

WEARABLE APPARATUS AND METHOD FOR CAPTURING IMAGE DATA USING MULTIPLE IMAGE SENSORS

CROSS REFERENCES TO RELATED APPLICATIONS

This application claims the benefit of priority of U.S. Provisional Patent Application No. 62/027,936, filed on Jul. 23, 2014, and U.S. Provisional Patent Application No. 62/027,957, filed on Jul. 23, 2014, all of which are incorporated herein by reference in their entirety.

BACKGROUND

I. Technical Field

This disclosure generally relates to devices and methods for capturing and processing images from an environment of a user. More particularly, this disclosure relates to devices and methods for capturing image data using multiple image sensors.

II. Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment. Therefore, there is a need for apparatuses and methods for automatically capturing and processing images in a manner that provides useful information to users of the apparatuses.

SUMMARY

Embodiments consistent with the present disclosure provide an apparatus and methods for automatically capturing and processing images from an environment of a user.

In accordance with a disclosed embodiment, a wearable apparatus for capturing image data from a plurality of fields of view is provided. The wearable apparatus includes a plurality of image sensors for capturing image data of an environment of a user. Each of the image sensors is associated with a different field of view. The wearable apparatus includes an attachment mechanism configured to enable the image sensors to be worn by the user. The wearable apparatus also includes at least one processing device programmed to process image data captured by at least two of the image sensors to identify an object in the environment of the user. The at least one processing device is also programmed to identify a first image sensor from among the at least two image sensors. The first image sensor has a first optical axis closer to the object than a second optical axis of a second image sensor from among the at least two image sensors. After identifying the first image sensor, the at least one processing device is also programmed to process image data from the first image sensor using a first processing scheme, and process image data from the second image sensor using a second processing scheme.

In accordance with another disclosed embodiment, a method for capturing image data from a wearable device is provided. The method includes processing image data captured by at least two image sensors included in the wearable device to identify an object in an environment of the user. Each of the image sensors includes a different field of view. The method also includes identifying a first image sensor from among the at least two image sensors. The first image sensor has a first optical axis closer to the object than a second optical axis of a second image sensor from among the at least two image sensors. The method further includes after identifying the first image sensor, processing image data from the first image sensor using a first processing scheme, and processing image data from the second image sensor using a second processing scheme.

In accordance with yet another disclosed embodiment, a wearable apparatus for capturing image data from a plurality of fields of view is provided. The wearable apparatus includes a plurality of image sensors for capturing image data of an environment of a user. Each of the image sensors is associated with a different field of view. The wearable apparatus also includes an attachment mechanism configured to enable the image sensors to be worn by the user. The wearable apparatus further includes at least one processing device programmed to process image data captured by at least one of the image sensors to identify a chin of the user. The at least one processing device is also programmed to activate at least one additional image sensor to capture image data of a portion of the environment in front of the user based on the identification of the chin.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example of the wearable apparatus shown in FIG. 1B from a first viewpoint.

FIG. 4B is a schematic illustration of the example of the wearable apparatus shown in FIG. 1B from a second viewpoint.

DETAILED DESCRIPTION

Figure 1A:
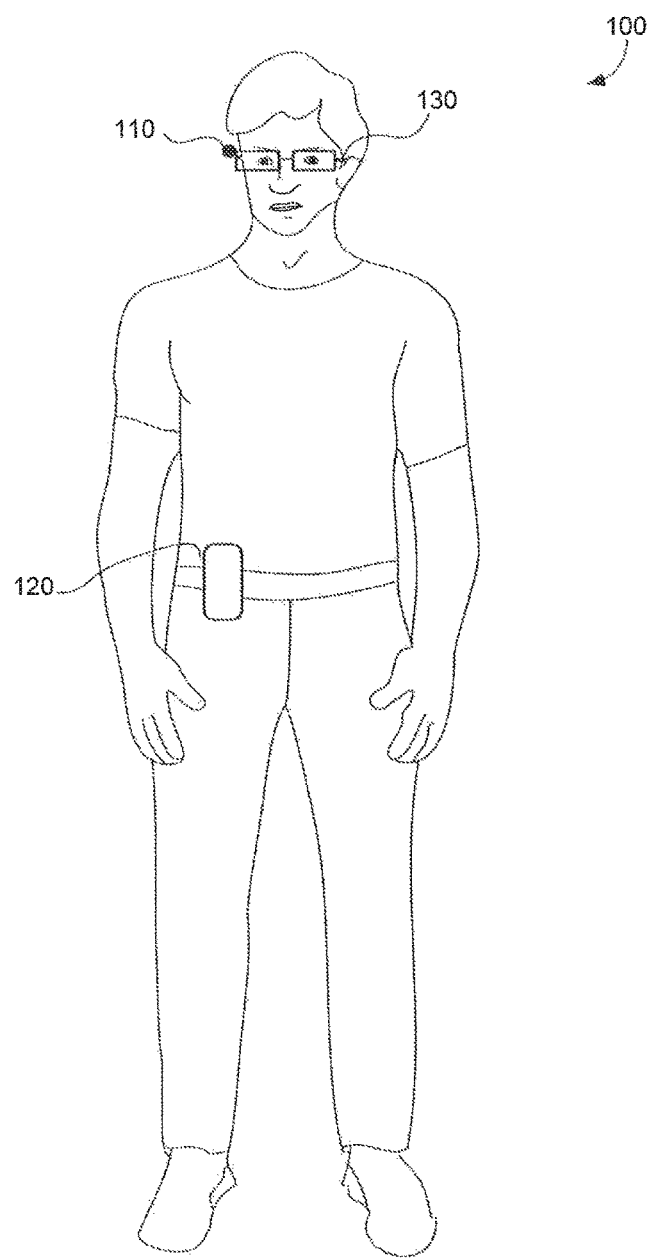
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or more lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
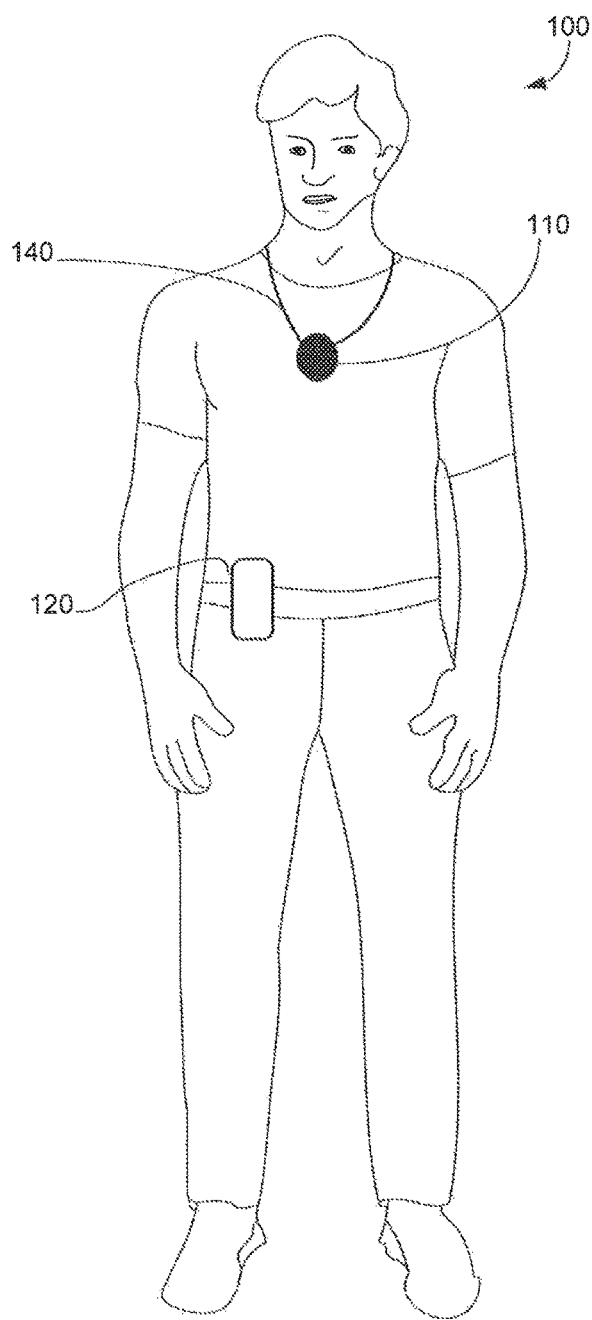
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
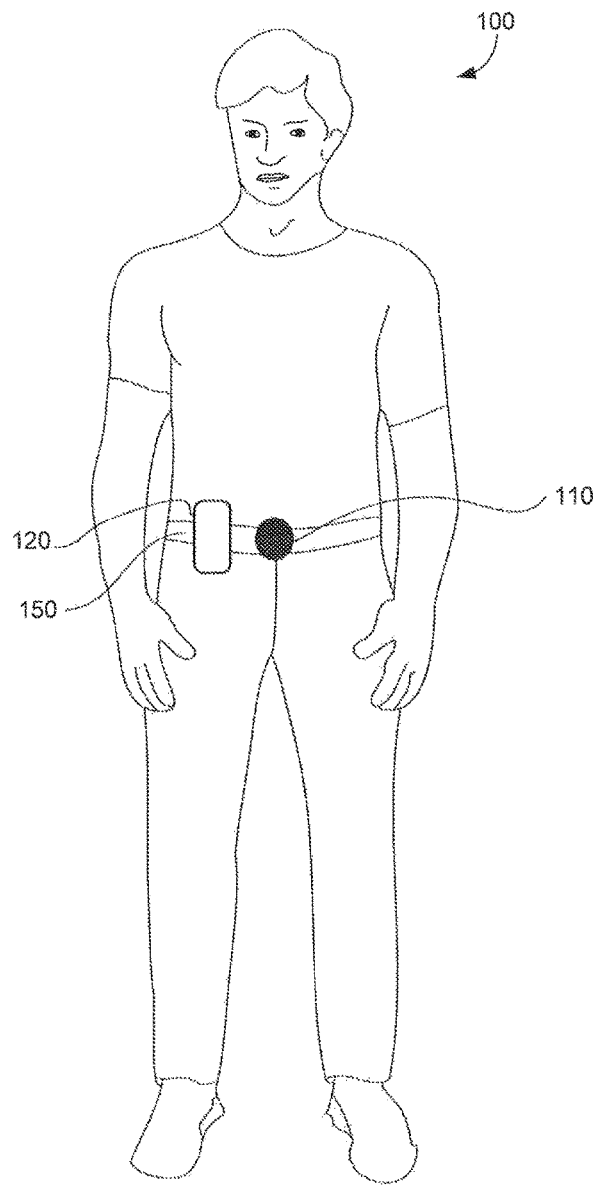
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
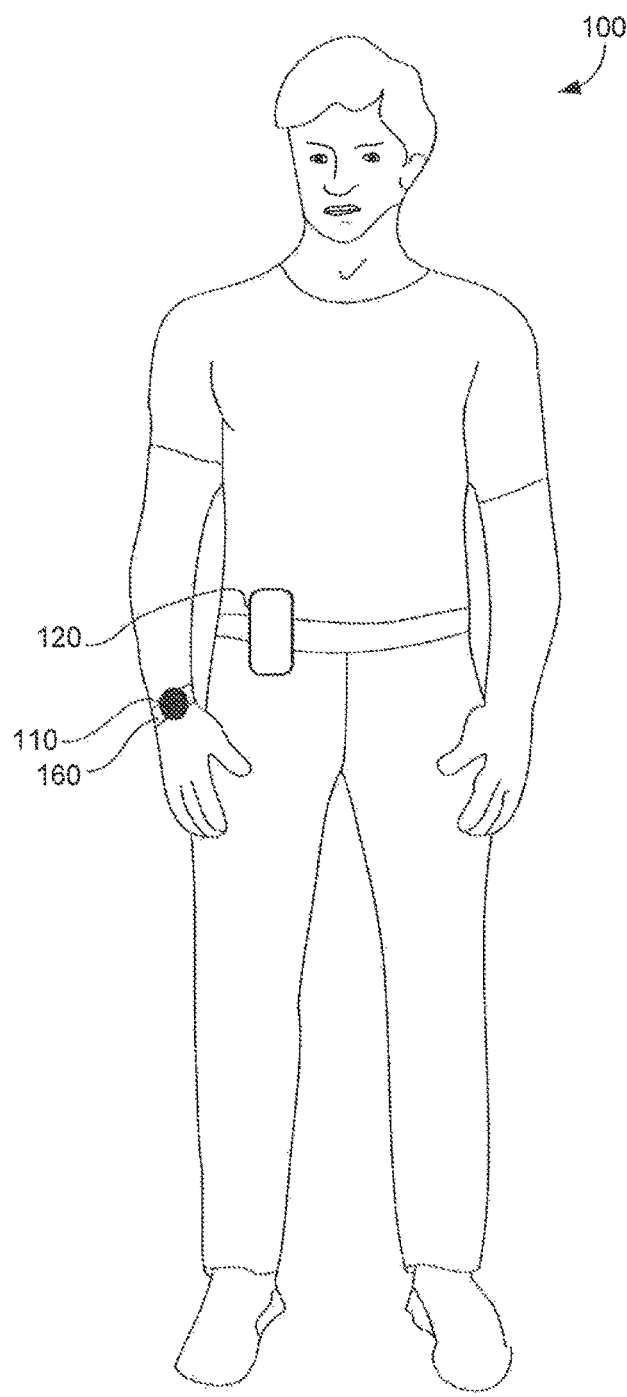
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
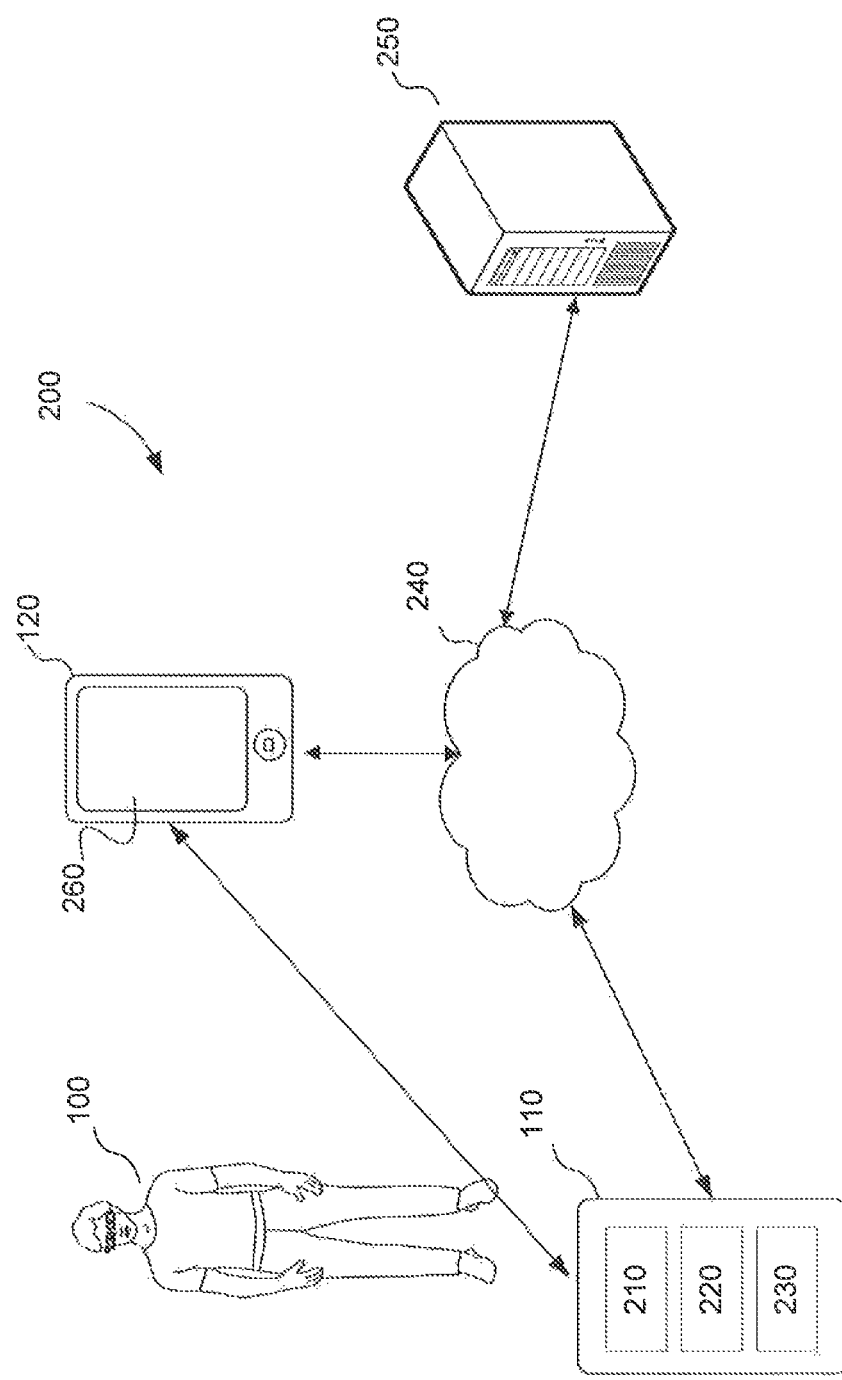
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-field capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
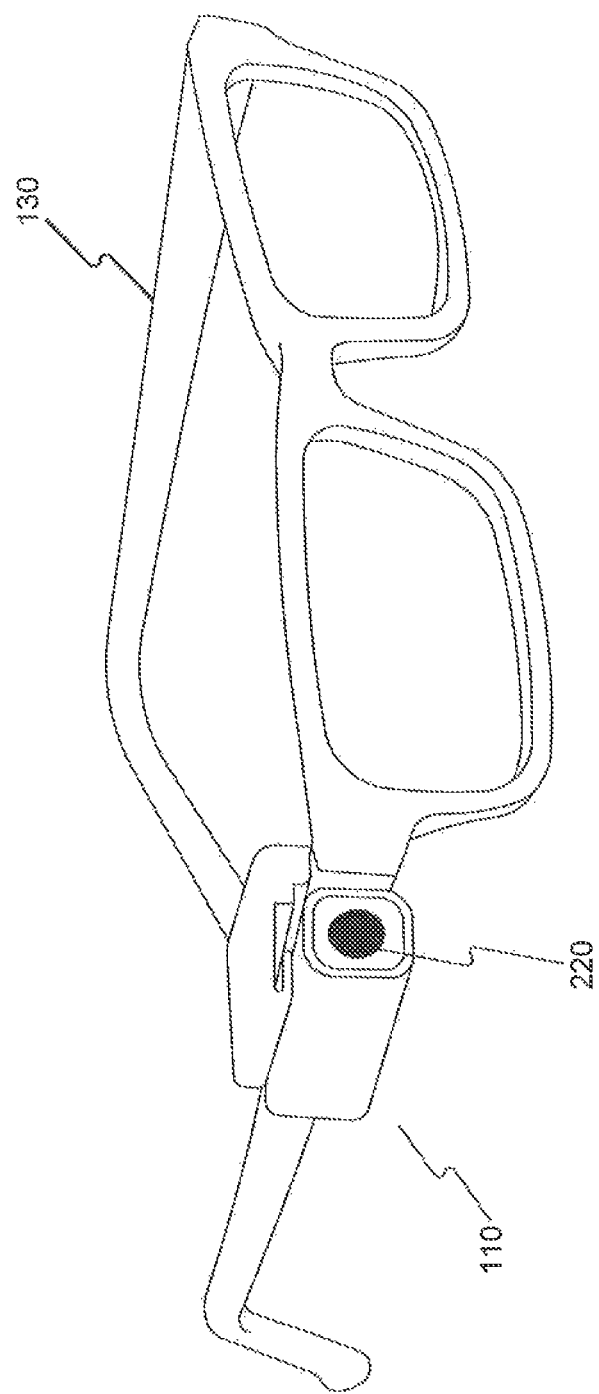
FIG. 3A is a schematic illustration of an example of the wearable apparatus shown in FIG. 1A.

An example wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
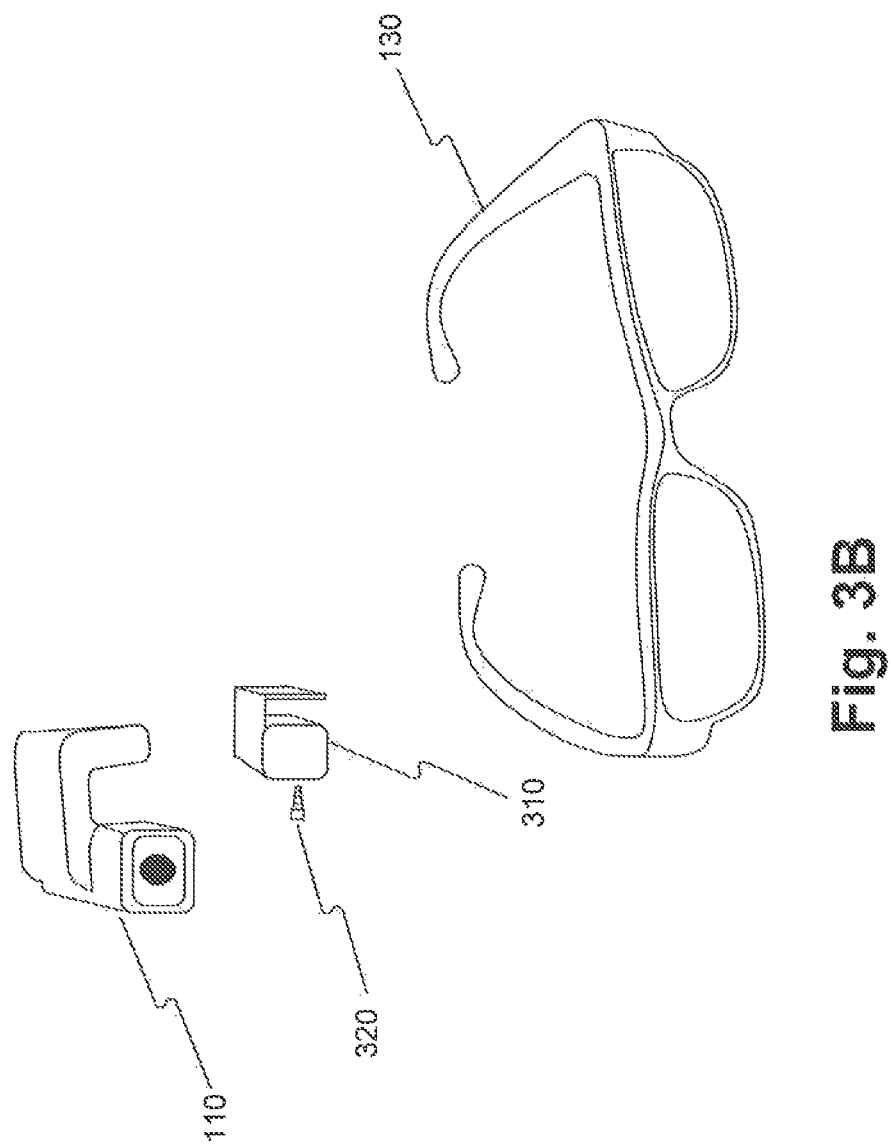
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
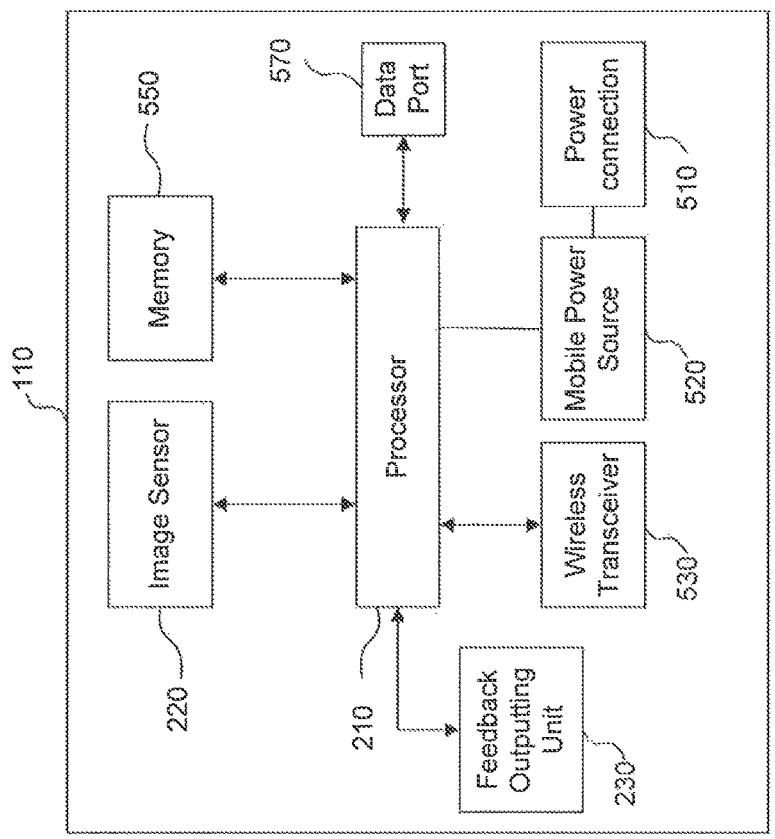
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 510 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
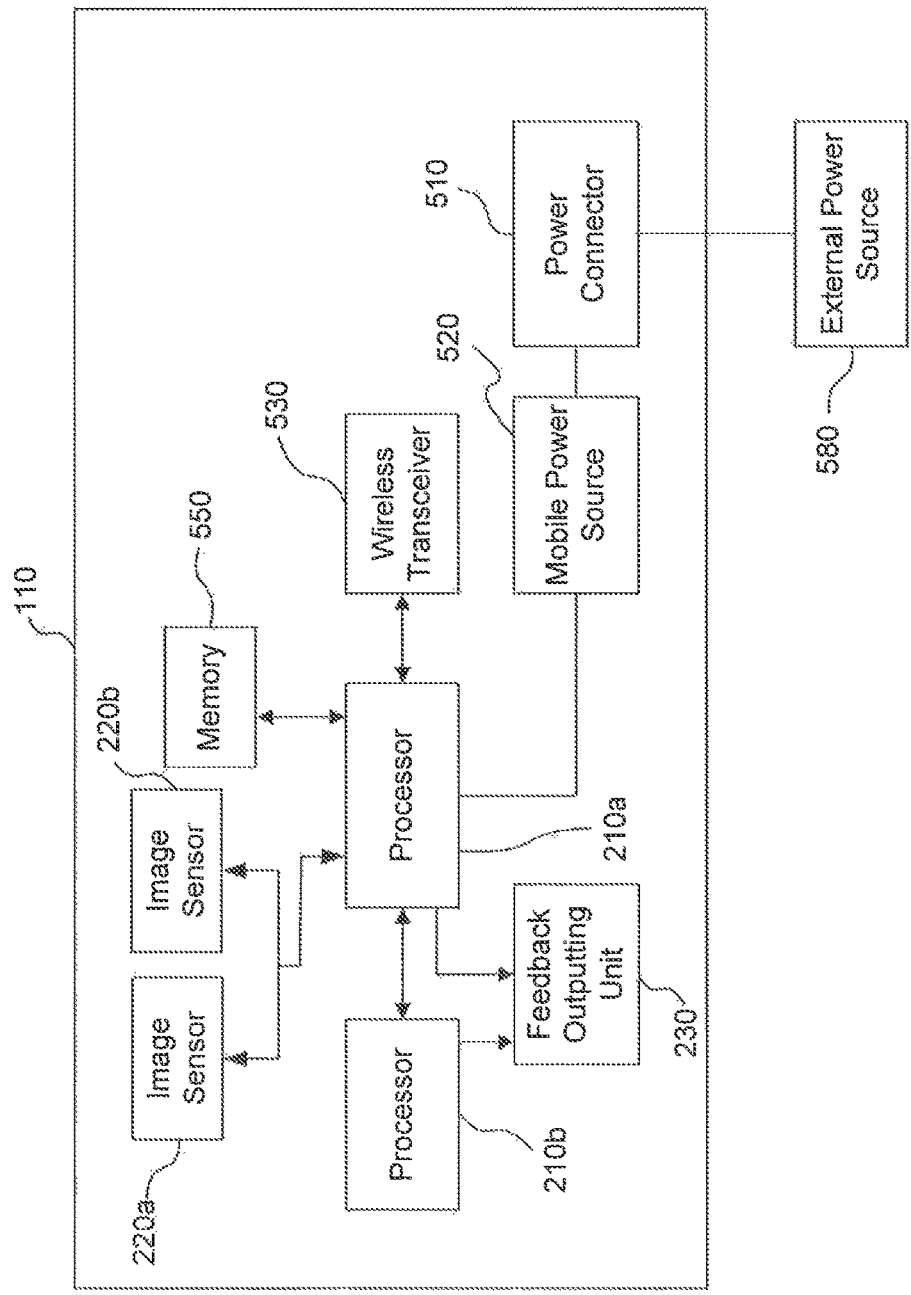
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback-outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identified hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
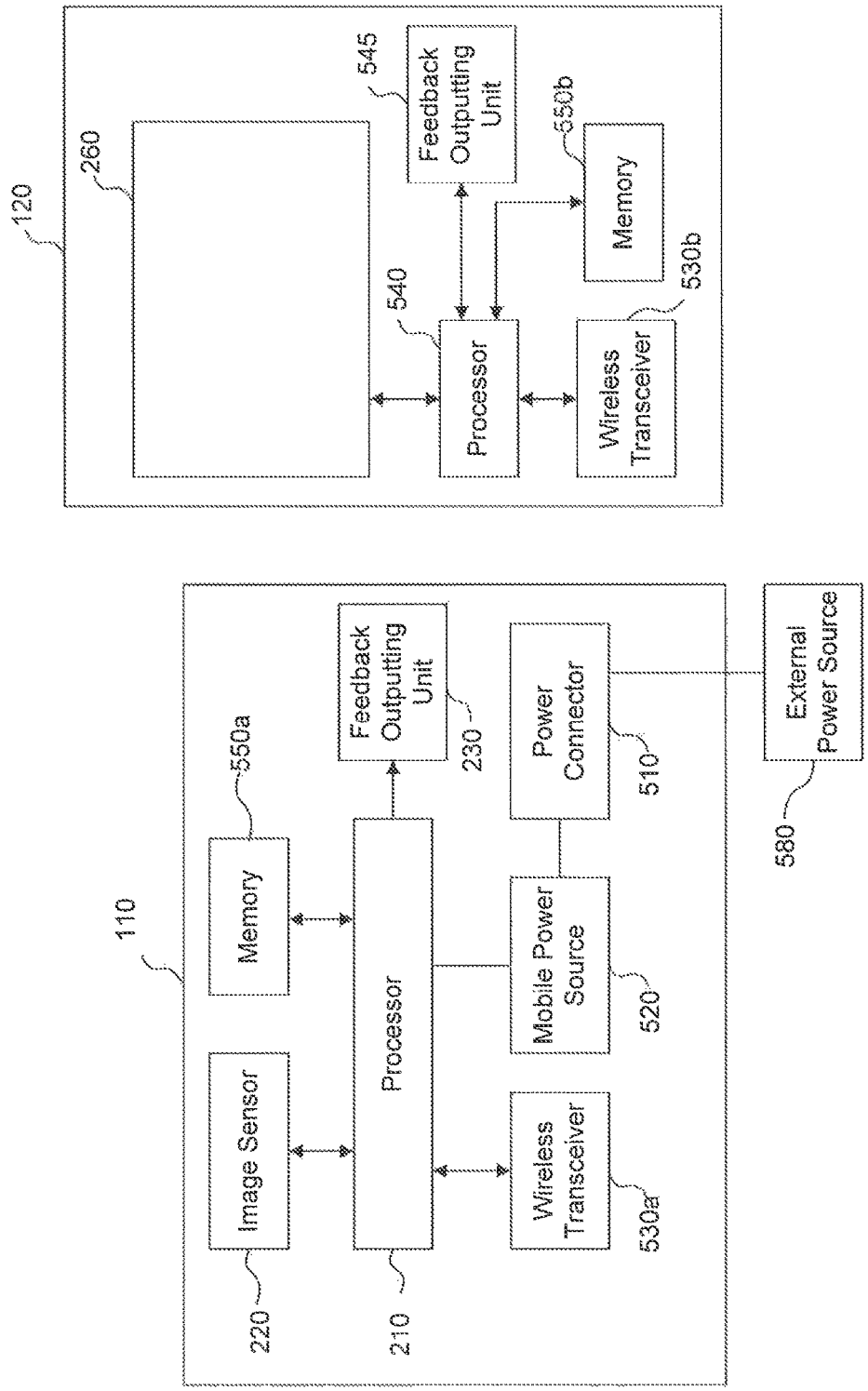
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. Therefore, the foregoing configurations are examples and, regardless of the configurations discussed above, apparatus 110 can capture, store, and process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Wearable apparatus 110 may be configured to capture image data of an environment of user 100 using a plurality of image sensors, with each of the image sensors associated with a field of view. The image sensors may be included in one or a plurality of cameras. Each of the plurality of image sensors may be associated with an optical axis. Two or more optical axes associated with two or more image sensors may be oriented in different directions, in a fixed or adjustable manner, to cover different fields of view and/or overlapping fields of view. Some or all of the plurality of image sensors may be selectively activated, e.g., by at least one processing device, to capture image data of the environment of user 100. The at least one processing device may include at least one of processors 210, 210a, 210b, and 540. The selected image sensors may have a combined field of view that includes a targeted object or a targeted environment. Image data captured by different image sensors may be combined, by the processing device, to generate image data having a higher resolution than the individual resolution of any one of the image sensors.

In some embodiments, the image sensors may be low resolution image sensors, which may capture low resolution image data (e.g., image data having a low resolution of 0.5 Megapixels, 1.0 Megapixels, 1.5 Megapixels, etc.). A low resolution and a high resolution may be defined based on resolutions used in digital cameras that are available in present market. For example, in the market at the time of this invention, 0.5 Megapixels, 1.0 Megapixels, 1.5 Megapixels, 3.0 Megapixels may be considered low resolutions. 5.0 Megapixels, 7.0 Megapixels, 10 Megapixels, 20 Megapixels may be considered high resolutions. In addition, the definition of low and high resolutions may change as the imaging technology evolves. For example, five years from the filing of this application, the digital imaging technology may have advanced. 10 Megapixels may be considered a low resolution by then. Furthermore, the definition of low and high resolutions may depend on implementations. For example, in some implementations of wearable apparatus 110, 3.0 Megapixels may be considered a high resolution. In some implementations, 5.0 Megapixels may be considered a low resolution.

In some embodiments, the resolutions of the image sensors may be adjustable within a range from low to high (e.g., from 1.0 Megapixels to 5 Megapixels). When desired, the image sensors may be adjusted to a low resolution (e.g., 1.5 Megapixels), such that the captured image data has a low resolution. The low resolution image data may be combined to generate higher resolution image data (e.g., 3.0 Megapixels). A higher resolution is relative, and may not fall within the definition of high resolution. In some embodiments, the image sensors may be adjusted to have a high resolution (e.g., 5.0 Megapixels), such that the captured image data has the high resolution. High resolution image data captured by different image sensors may still be combined by the processing device to generate image data having an even higher resolution. By capturing low resolution image data and combining the captured data to generate higher resolution image data, the storage space needed to store captured image data may be reduced. In addition, when image sensors of low resolution are used, a cost of the materials associated with wearable apparatus 110 may be reduced. Further, due to the ability to combine low resolution image data to generate higher resolution image data, the imaging quality of wearable apparatus 110 is not compromised.

When at least one image sensor captures a visual trigger, two or more image sensors may be selectively activated, reoriented, or actuated to operate simultaneously. For example, one image sensor may be actively capturing image data of an environment of user 100, while other image sensors may be in an "idle" state to save energy. In the "idle" state, the image sensors may be turned off or not supplied with power, such that the sensors are not capturing image data. In some embodiments, in the idle state, the sensors may be capturing image data at a minimum resolution, or may be capturing image data but not transmitting the image data to a data storage device for storage, such that the processing device are not processing the captured image data. When the processing device identifies a visual trigger from the captured image data from the active image sensor, the processing device may selectively activate one or more images sensors from their "idle" state such that the one or more image sensors may operate together or simultaneously with the already active image sensor to capture image data of the visual trigger, or to capture image data of objects or environment associated with the visual trigger. By having two or more image sensors operating simultaneously to capture image data of the same target object or environment, more details regarding the visual trigger, or the objects or environment associated with the visual trigger, may be captured.

Wearable apparatus 110 may include energy devices configured to provide power to wearable apparatus 110 and save energy costs associated with operating wearable apparatus 110. For example, wearable apparatus 110 may include at least one solar cell configured to convert the solar energy into electrical energy, which may be used to power some components of wearable apparatus 110, such as the image sensors. Using solar cells to provide at least a portion of the energy needed to operate wearable apparatus 110 may help reduce the costs associated with operating wearable apparatus 110, and prolong the standby and operation time of wearable apparatus 110.

In some embodiments, wearable apparatus 110 may be associated with a body power harvesting device, such as one converting the body motion or mechanical energy into electrical energy. The converted electrical energy may be used to power certain components of wearable apparatus 110, such as the image sensors. This may reduce the energy cost associated with operating wearable apparatus 110 and prolong the standby and operation time of wearable apparatus 110.

In some embodiments, wearable apparatus 110 may include a directional microphone configured to detect or receive sounds (e.g., a sound wave) such as, for example, a voice. The processing device may analyze the detected sound and identify a direction of the sound wave received by the microphone. Based on the direction of the detected sound wave, the processing device may selectively activate one or more image sensors to capture image data of an object or an environment in the identified direction. The microphone may be selectively activated to detect a sound and transmit the detected voice to a data storage device for storage. In some embodiments, the selective activation of the microphone may be based on detecting movement of a chin of user 100 from two or more images captured by the image sensors.

At least one processing device may be programmed to process the captured image data to identify an object in the environment. When a first image sensor is identified as having captured image data of the object, the processing device may be programmed to process image data from the first image sensor using a first processing scheme. The first processing scheme may include continuing to process the image data received from the at least first image sensor. When a second image sensor is identified as having not captured image data of the object, the processing device may be programmed to process image data from the second image sensor using a second processing scheme. The second processing scheme may include discontinuing processing the image data received from the second image sensor. In some embodiments, the processing device may be further programmed to resume processing image data captured from the second image sensor after a predetermined time period has elapsed. In some embodiments, the processing device may be further programmed to discontinue processing image data from the first image sensor when the object is no longer in the field of view of the first image sensor. In some embodiments, the processing device may be further programmed to cause the second image sensor to discontinue capturing image data for at least a portion of a time period during which image data from the first image sensor is being processed.

At least one processing device may be programmed to process the captured image data to identify an object in the environment. The processing device may be programmed to process image data from at least a first image sensor using a first processing scheme when the first image sensor is identified as having captured image data of the object. The processing device may be programmed to process image data from at least a second image sensor using a second processing scheme when the second image sensor is identified as having not captured image data of the object.

Figure 6:
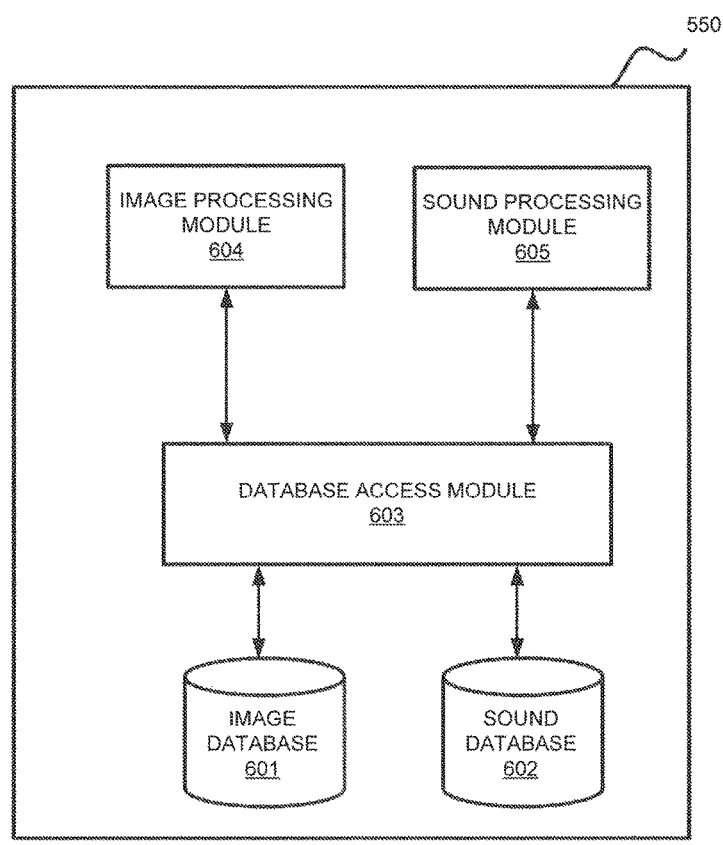
FIG. 6 is a diagram illustrating an example memory storing a plurality of modules according to a disclosed embodiment.

FIG. 6 is a block diagram illustrating a memory (e.g., memory 550, 550a, and/or 550b) according to the disclosed embodiments. The memory may include one or more modules, or sets of instructions, for performing methods consistent with the disclosed embodiments. For example, the memory may include instructions for at least one processing device to analyze images captured by the image sensors and/or voice detected by the microphone. In some embodiments, the processing device may be included in wearable apparatus 110. For example, the processing device may be processor 210, 210a, and/or 210b shown in FIGS. 5A and 5B. The processing device may process the image data captured by the image sensors in near real time, as the image data are being captured by the image sensors. In some embodiments, the processing device may be a processor that is separately located from wearable apparatus 110. The processing device may be a processor that is remotely connected with wearable apparatus 110 through network 240, which may be a wired or wireless network, or through any other connectivity means, such as Bluetooth, near field communication (NFC), etc. For example, the processing device may include processor 540 included in computing device 120, which may be connected with wearable apparatus 110 through a wired or wireless connection, such as through a cable, Bluetooth, WiFi, infrared, or near field communication (NFC). In some embodiments, the processing device may be a processor included in server 250, which may be wirelessly connected with wearable apparatus 110 through network 240. In some embodiments, the processing device may be a cloud computing processor remotely and wirelessly connected with wearable apparatus 110 through network 240. Wearable apparatus 110 may transmit captured image data to the processing device in near real time, and the processing device may process the captured image data and provide results of processing to wearable apparatus 110 in near real time.

In the example shown in FIG. 6, memory 550 comprises an image database 601, a sound database 602, a database access module 603, an image processing module 604, and a voice processing module 605, for performing the functionality of the disclosed methods. Additional or fewer databases and/or modules may be included in memory 550. The modules and databases shown in FIG. 6 are by example only, and a processor in the disclosed embodiments may operate according to any suitable process.

In the embodiment shown in FIG. 6, memory 550 is configured to store an image database 601. Image database 601 may be configured to store various images, such as images captured by an image sensor (e.g., image sensor 220, 220a, and/or 220b). Image database 601 may also be configured to store data other than image data, such as textual data, audio data, video data, etc. Alternatively or additionally, memory 550 may include a sound database 602 configured to store audio data, such as sound or voice data.

As shown in FIG. 6, memory 550 is also configured to store a database access module 603. The processing device may execute instructions associated with database access module 603 to access image database 601 and sound database 602, for example, to retrieve previously stored image data captured by the image sensor for analysis. In some embodiments, the processing device may execute instructions associated with database access module 603 to retrieve previously stored sound data (e.g., a voice) that may be received by a microphone. The processing device may also execute instructions associated with database access module 603 to store image data into image database 601 and store sound data into sound database 602.

In the embodiment shown in FIG. 6, memory 550 is configured to store an image processing module 604. The processing device may execute instructions associated with image processing module 604 to perform various analyses and processes of image data captured by the image sensor to identify an object. Based on whether the object is identified in image data captured by a first image sensor or a second image sensor, the processing device may execute instructions associated with image processing module 604 to determine whether to continue processing image data received from the first image sensor, or continue processing image data received from the second image sensor.

In the embodiment shown in FIG. 6, memory 550 is configured to store a sound processing module 605. The processing device may execute instructions associated with sound processing module 605 to perform various analyses and processes of audio data, such as those recorded by a microphone. The processing device may execute instructions associated with sound processing module 605 to determine a direction associated with a sound. For example, the processing device may estimate an angle of the sound traveling toward user 100 relative to a horizontal direction 910 shown in FIG. 9, or an optical axis 722 of image sensor 712 shown in FIG. 7, which may align with the horizontal direction 910 when the sound is detected. The direction information about the sound data may be used by sound processing module 605 and/or image processing module 604 to select one or more image sensors for capturing image data of an object or environment in the determined direction.

Figure 7:
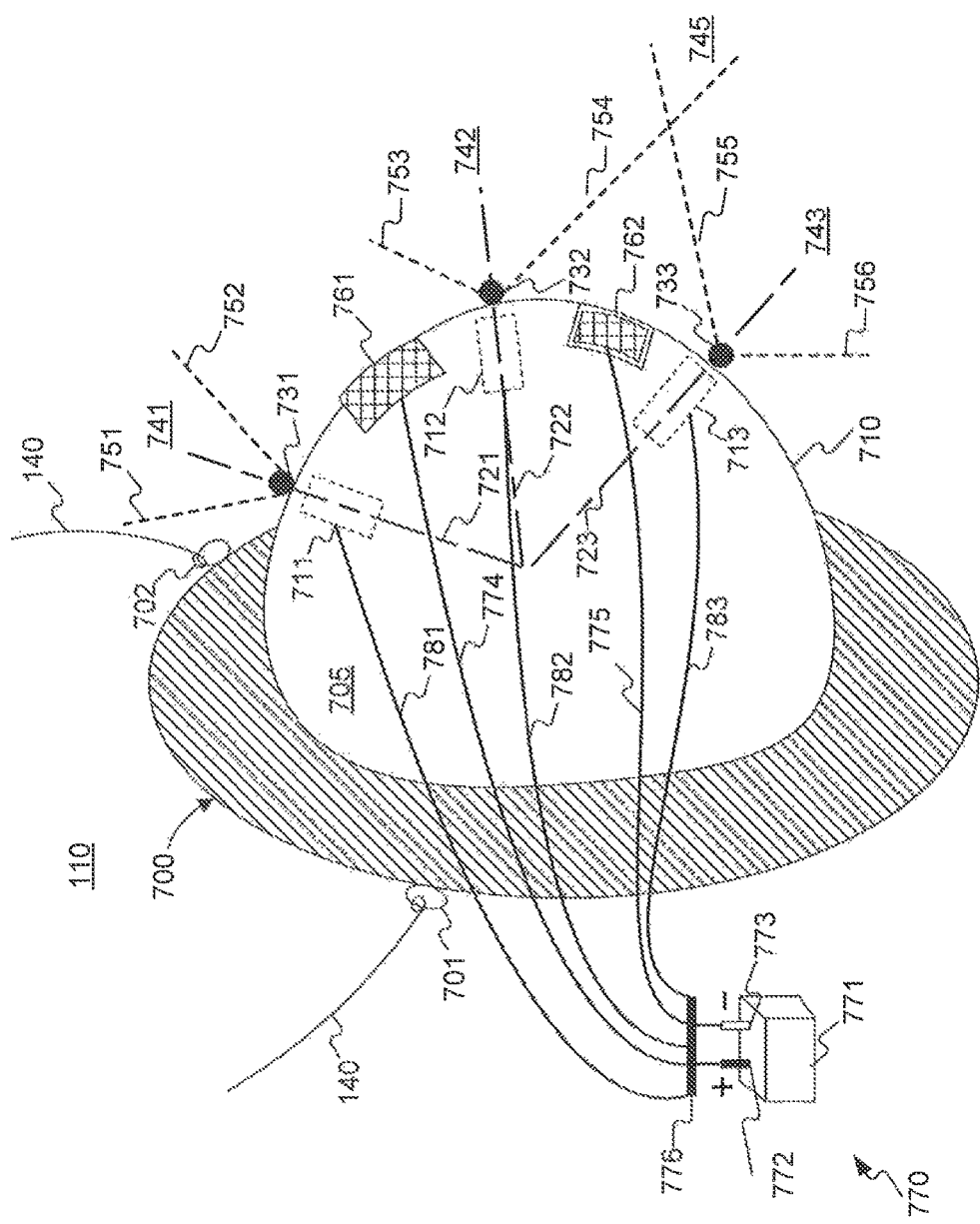
FIG. 7 is a schematic illustration of perspective view of an example wearable apparatus having a plurality of image sensors for capturing image data according to a disclosed embodiment.

FIG. 7 is a schematic illustration of a perspective view of an example wearable apparatus 110 having a plurality of image sensors for capturing and processing image data of an environment of user 100, consistent with the disclosed embodiments. Wearable apparatus 110 may be worn by user 100 in various ways through an attachment mechanism. The attachment mechanism may include any suitable means. For example, as shown in FIG. 1B, wearable apparatus 110 may be carried on necklace 140 worn by user 100. As shown in FIG. 3A, wearable apparatus 110 may be attached to eye glasses 130 through support 310 and screw 320. As shown in FIG. 4A, wearable apparatus 110 may include a hanging ring 410 for attaching to, for example, necklace 140. As shown in FIG. 4B, wearable apparatus 110 may include a clip 420 for attaching to the belt or cloth of user 100. FIG. 7 shows that wearable apparatus 110 may include a base 700 to which necklace 140 may be attached through two fastening devices 701 and 702 (or through a hanging ring similar to hanging ring 410 disclosed in FIG. 4A). In some embodiments, wearable apparatus 110 may be worn on a user's head (e.g., clipped to a cap, hat, or helmet worn by user 100) or a user's arm (e.g., secured via an arm band, a magnetic coupler, or any other suitable means).

Wearable apparatus 110 may include an image capturing unit 705 (or a capturing unit 705) mounted on base 700. Any suitable mounting means, such as glue, screws, bolts and nuts, clamping, etc., may be used for mounting capturing unit 705 onto base 700. Image capturing unit 705 may include a housing 710 having a semi-sphere, half sphere, or sphere shape. Housing 710 may include other three-dimensional shapes, such as cubic shape, cylindrical shape, etc.

Wearable apparatus 110 may include a plurality of image sensors. The plurality of image sensors may include any suitable number of image sensors, such as two, three, four, etc. In some embodiments, the plurality of image sensors may be included in one camera. In some embodiments, the plurality of image sensors may be included in a plurality of cameras, with each image sensor included in each camera. In the example shown in FIG. 7, image capturing unit 705 includes three image sensors 711, 712, and 713. More or less image sensors may be included. Image sensors 711, 712, and 713 may be included within housing 710, and may or may not be visible from outside housing 710 depending on the transparency of the material of housing 710.

Each of image sensors 711, 712, and 713 may be similar to image sensors 220, 220a, and 220b discussed above and depicted in, e.g., FIGS. 2, 5A, and 5B. Each of image sensors 711, 712, and 713 may be associated with an optical axis 721, 722, and 723, respectively. Two or more optical axes may be oriented in different directions. For example, optical axis 722 may be oriented in a substantially horizontal direction (e.g., a direction that is roughly or substantially perpendicular to the chest of user 100). Optical axis 721 may be oriented in a direction that is about, e.g., 45° to 60° from the optical axis 722 pointing upward, and optical axis 723 may be oriented in a direction that is about, e.g., 45° to 60° from the optical axis 722 pointing downward. Two or more optical axes may be divergent. For example, optical axis 721 and optical axis 723 are divergent (e.g., they point outward away from housing 710 and do not overlap outside of housing 710). An angle between two or more optical axes may be greater than about 20°. For example, the angle between optical axis 721 and optical axis 722 is about e.g., 45° to 60°. The angle between optical axis 721 and optical axis 722 may be less than about 90°, for example, about 45° to 60°.

In some embodiments, more than three image sensors (and hence more than three lenses) may be included in wearable apparatus 110. For example, wearable apparatus 110 may include five, ten, or fifteen image sensors. The image sensors and the associated lenses may be distributed at different locations such that the associated lenses point to different directions around the sphere or semi-sphere shape housing 710. Any suitable distribution patterns may be used for disposing the image sensors and lenses, such that the fields of view of the image sensors cover a desired space and directions. The image sensors and lenses may be distributed such that when wearable apparatus 110 is worn by user 100, there is at least one image sensor whose optical axis may be placed substantially in the horizontal direction. As user 100 moves, the orientations of the lenses (e.g., orientations of the optical axes of the image sensors) may change. In some embodiments, one or more optical axes of the image sensors may point toward the horizontal direction.

Each of image sensors 711, 712, and 713 may be associated with at least one lens 731, 732, and 733, respectively. Lenses 731, 732, and 733 may be at least partially disposed on the outer surface of housing 710. Although shown as being disposed on the same curve line of housing 710, lenses 731, 732, and 733 may be disposed at any other locations on housing 710. Each of image sensors 711, 712, and 713 may be associated with a field of view 741, 742, and 743, respectively. The field of view 741 is schematically shown in FIG. 7 as defined by dashed lines 751 and 752, field of view 742 is schematically shown in FIG. 7 as defined by dashed lines 753 and 754, and field of view 743 is schematically shown in FIG. 7 as defined by dashed lines 755 and 756. The fields of views 741, 742, and 743 are different from one another. Some of the fields of view 741, 742, and 743 overlap, and some do not overlap. For example, fields of view 742 and 743 overlap at a zone 745. A combined angle of the fields of view 741, 742, and 743 may be more than 100°. As schematically illustrated in FIG. 7, the angle formed by the dashed lines 751 and 756 may be more than 120°, for example, near 180°.

In some embodiments, the orientation (i.e., direction) of each of the optical axes 721, 722, and 723 may be fixed or adjustable. For example, one or more electric motors (not shown) may be associated with image sensors 711, 712, and 713, and may drive a suitable adjustment mechanism (not shown) included in each of image sensors 711, 712, and 713 to adjust the orientation of optical axes 721, 722, and 723. The motor and adjustment mechanism may be any suitable devices known in the art. All or some of the optical axes 721, 722, and 723 may be adjustable. When the orientations of optical axes 721, 722, and 723 are adjusted, the fields of view 741, 742, and 743 may also be adjusted. The adjustment of the orientations of optical axes 721, 722, and 723 may be limited to be within a certain degree, such as ±5° from the initial orientations of optical axes 721, 722, and 723.

Image sensors 711, 712, and 713 may have the same or different resolution. In some embodiments, some or all of image sensors 711, 712, and 713 may have a low resolution. Using low resolution image sensors may reduce the overall cost of wearable apparatus 110. When image sensors 711, 712, and 713 have low resolutions, the low resolution image data captured by image sensors may be combined or aggregated to produce image data having a higher resolution than the individual resolution of any of image sensors 711, 712, and 713. The processing device may be programmed to combine the low resolution image data to produce the higher resolution image data. In some embodiments, image sensors 711, 712, and 713 are each configured to provide an image resolution less than about 1.5 Megapixels, less than 3 Megapixels, less than 5 Megapixels, less than 10 Megapixels, less than 15 Megapixels, and/or less than 20 Megapixels. In some embodiments, the 1.5 Megapixels and 3 Megapixels may be considered low resolutions and others may be considered high resolutions.

Wearable apparatus 110 may include at least one solar cell configured to provide power to at least one of image sensors 711, 712, and 713. As shown in FIG. 7, wearable apparatus 110 may include two solar cells 761 and 762. Solar cells 761 and 762 may be configured to convert the solar energy into electrical energy, and provide the electrical energy to power one or more components of wearable apparatus 110, such as image sensors 711, 712, and 713. Additional or fewer solar cells may be included. In some embodiments, the solar cells 761 and 762 may provide power to at least one of the image sensors 711, 712, and 713 to power, e.g., the electronic circuit and/or the electrical motor configured for adjusting the orientations of the image sensors 711, 712, and 713.

Solar cells 761 and 762 may be included in capturing unit 705 that includes image sensors 711, 712, and 713. As shown in FIG. 7, solar cells 761 and 762 may be interspersed between lenses 731, 732, and 733. Although not shown, solar cells 761 and 762 may be disposed at other locations on the outer surface of housing 710, such as locations that are not between lenses 731, 732, and 733.

Wearable apparatus 110 may include a power unit 770 electrically connected with solar cells 761 and 762. In some embodiments, power unit 770 may be incorporated within base 700 or housing 710. In some embodiments, as shown in FIG. 7, power unit 770 may be provided separately from base 700 or housing 710 and be electrically connected with other components of wearable apparatus 110. For example, power unit 770 may be clipped to the belt of user 100. Power unit 770 may include a battery 771 configured for storing at least some energy generated by solar cells 761 and 762. Solar cells 761 and 762 may be electrically connected with a positive terminal 772 and a negative terminal 773 of battery 771 through connection lines 774, 775, and a power control line 776.

Solar cells 761 and 762 included in wearable apparatus 110 may provide at least some energy to power some components of wearable apparatus 110, such as image sensors 711, 712, and 713. Power unit 770 may be electrically connected with image sensors 711, 712, and 713 through wires 781, 782, 783, and power control line 776 to supply power to image sensors 711, 712, and 713. Using solar cells to supply at least a portion of the energy needed to power components of wearable apparatus 110 may reduce the cost associated with operating wearable apparatus 110, and may prolong the standby and operation time of wearable apparatus 110. Power unit 770 may include a separate battery configured to provide additional energy for the operation of wearable apparatus 110.

Figure 8:
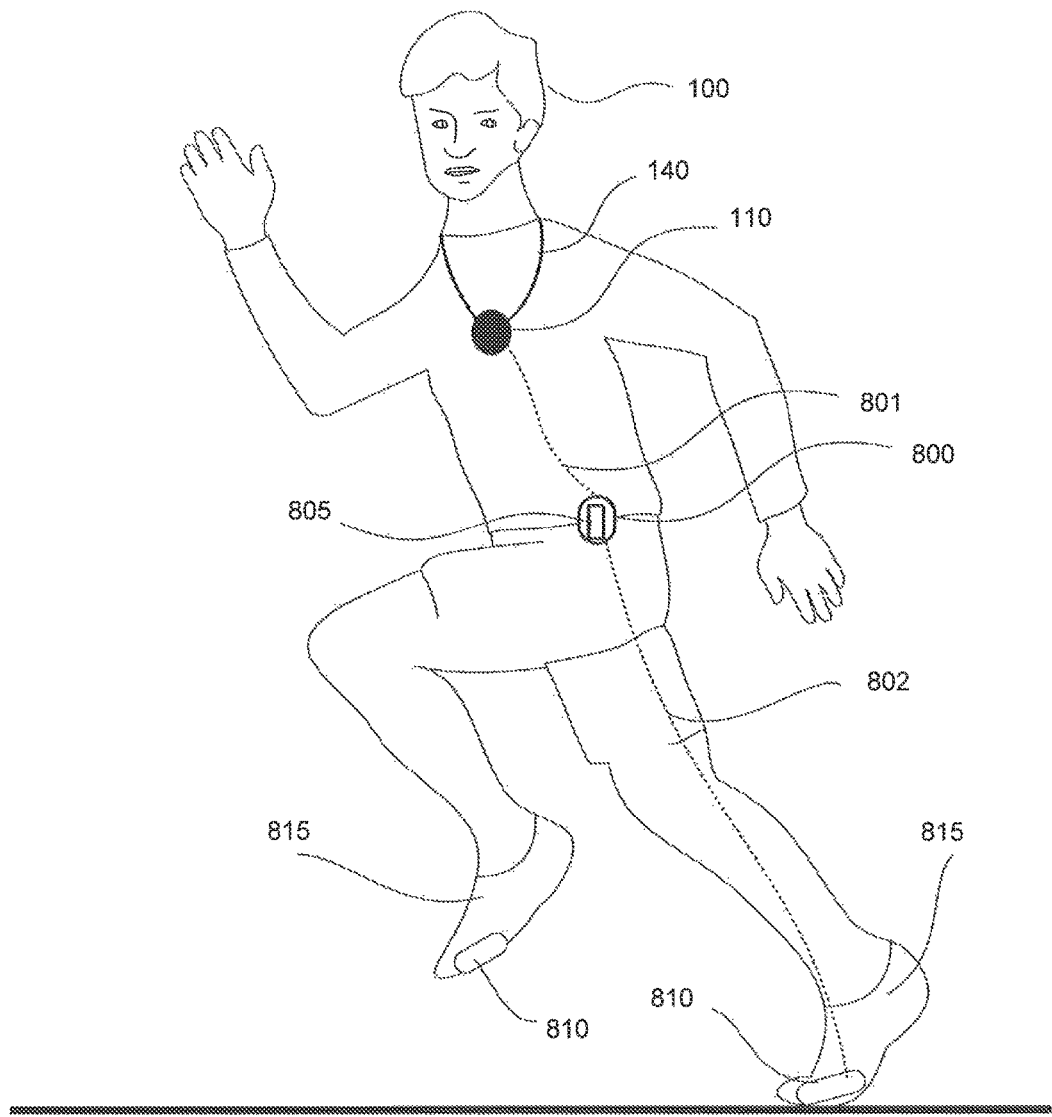
FIG. 8 is a schematic illustration of an example of the user wearing a wearable apparatus according to a disclosed embodiment.

FIG. 8 is a schematic illustration of an example of user 100 wearing wearable apparatus 110 according to certain disclosed embodiments. In this example, wearable apparatus 110 may include a power unit 800 including an energy storage device 805 (e.g., a battery, a capacitor, etc.) configured to store energy derived from movements of user 100. In some embodiments, power unit 800 may be incorporated within housing 710 or base 700. In some embodiments, as shown in FIG. 8, power unit 800 may be provided separately from housing 710 or base 700 and may be electrically connected with other components, such as image sensors 711, 712, and 713 of wearable apparatus through one or more wires 801.

User 100 may carry a body power harvesting device 810 configured to convert body motion power into electrical energy. Body power harvesting device 810 may be electrically connected with power unit 800 through one or more wires 802. Wires 801 and 802 may be at least partially incorporated with the clothes user 100 is wearing. When user 100 is walking, running, or jumping, the feet of user 100 may impact the ground with shoes 815 and the impact may generate energy. In some embodiments, body power harvesting device 810 and wearable apparatus 110 may be included together in a housing (e.g., included inside a shared physical casing).

An example body power harvesting device 810 may include a piezoelectric device incorporated within or at the bottoms of shoes 815 worn by user 100. The piezoelectric device may be configured to convert mechanical energy generated by the impact between the ground and shoes 815 when user 100 is walking, running, or jumping, into electrical energy. The piezoelectric device includes piezoelectric materials that convert mechanical energy into electrical energy when the materials are bent and/or compressed.

Body power harvesting device 810 may supply converted electrical energy to energy storage device 805 for storage. The stored electrical energy may be used to power certain components of wearable apparatus 110, such as image sensors 711, 712, and 713. Harvesting a portion of the body motion power into electric power and use that for powering certain components of wearable apparatus 110 may reduce the energy cost associated with operating wearable apparatus 110 and may prolong the standby and operation time of wearable apparatus 110. In some embodiments, other body power harvesting devices, such as one that converts body heat energy into electrical energy may also be included in or otherwise associated with wearable apparatus 110. Further, in some embodiments, two or more of wearable apparatus 110, body power harvesting device 810, and energy store device 805 may be included together in a housing (e.g., included inside a shared physical casing).

Figure 9:
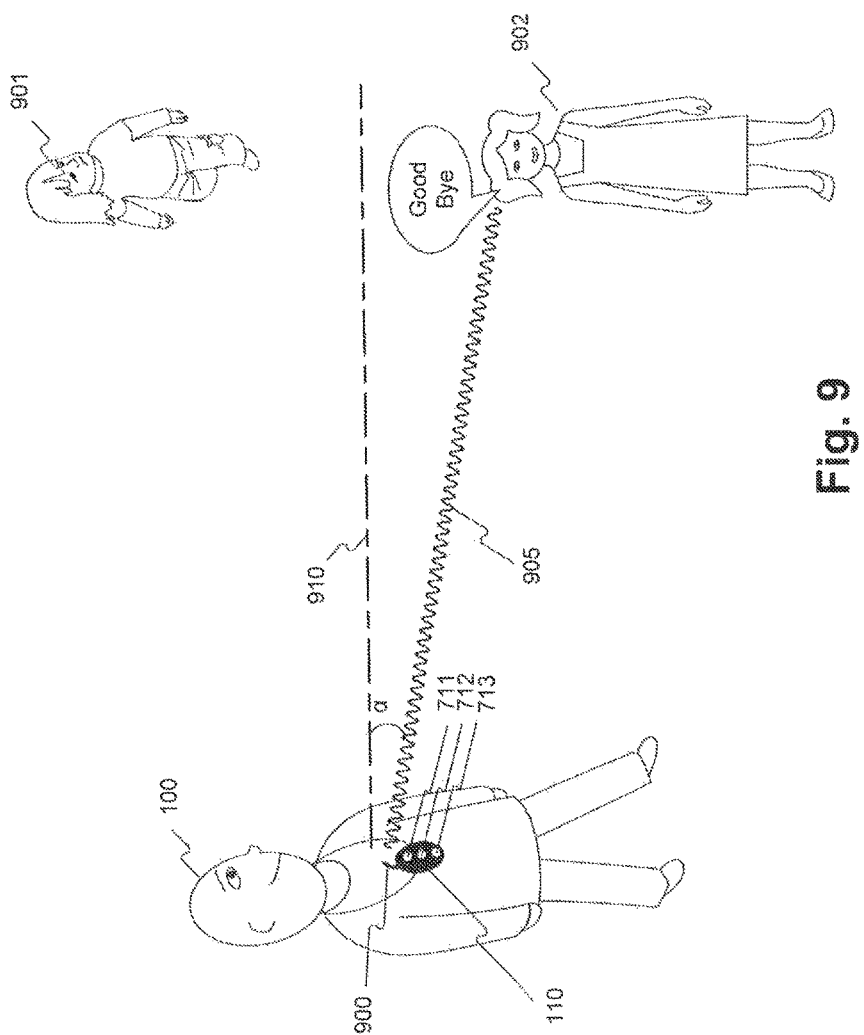
FIG. 9 shows an example environment including a wearable apparatus for capturing image data according to a disclosed embodiment.

FIG. 9 shows an example environment including wearable apparatus 110 for capturing image data. Wearable apparatus 110 may include a directional microphone 900 configured to detect or receive sound (e.g., a sound wave). Directional microphone 900 may be attached to base 700 (shown in FIG. 7). Directional microphone 900 may detect a sound (e.g., a voice), and provide the detected sound to sound database 602 for storage. The processing device (e.g., processor 210, 210a, 210b, or 540) may read or retrieve the sound data from sound database 602 and analyze the sound data to identify a direction of the sound wave received by microphone 900. Based on the direction of the detected sound wave relative to microphone 900 (and, in some embodiments, an orientation of the microphone 900 relative to wearable apparatus 110), the processing device may selectively activate one or more image sensors 711, 712, and 713 to capture image data of an object or environment in a field of view that includes the direction of sound wave.

As shown in FIG. 9, user 100 is faced with two persons, first person 901 and second person 902. Image sensors 711, 712, and 713, visibly shown on wearable apparatus 110 for illustrative purposes, may be in an idle state, in which state one or more of image sensors 711, 712, and 713 may be inactive (e.g., not capturing image data of the environment of user 100), or actively capturing image data of the environment, but not focusing on a particular object, such as persons 901 and 902. Additionally or alternatively, when image sensors 711, 712, and 713 are in idle state, image sensors 711, 712, and 713 may not be transmitting captured image data to image database 601 for storage, or the processing device may not be analyzing any of image data captured by image sensor 711, 712, and 713.

Directional microphone 900 may detect a voice 905 (or sound wave 905), "Good Bye," uttered by second person 902. The processing device may analyze the voice or sound wave 905 received by directional microphone 900 to identify a direction of sound wave 905, as indicated by an angle $\alpha$ with respect to a horizontal direction 910, or optical axis 722 of image sensor 712 shown in FIG. 7, which may align with the horizontal direction 910 when the sound is detected (e.g., when the capturing unit 705 is aligned such that optical axis 722 of image sensor 712 faces the middle of first and second persons 901 and 902 when the sound is detected). In some embodiments, microphone 900 may point to a direction that is substantially aligned with horizontal direction 910. In some embodiments, processing device may not identify the exact value of angle $\alpha$, but rather, may estimate a rough value of angle $\alpha$. Based on the identified direction (as indicated by angle $\alpha$), the processing device may selectively activate one or more of image sensors 711, 712, and 713. For example, all of the image sensors 711, 712, and 713 may be initially inactive (e.g., turned off). In some embodiments, the processing device may determine that the field of view associated with image sensor 711 includes the identified direction. The processing device may select image sensor 711 from the plurality of image sensors and activate it to capture image data of second person 902 who is within the field of view associated with image sensor 711.

In some embodiments, the processing device may determine that the fields of view associated with image sensors 712 and 713 include the identified direction, and may select image sensors 712 and 713 to capture image data of the environment (including second person 902) within their respective fields of view. The processing device may activate or reorient image sensors 712 and 713 such that they may capture image data including second person 902 who uttered the voice detected by directional microphone 900. In some embodiments, the processing device may prioritize captured image data for processing or analysis based on the directional information. For example, the processing device may give a higher priority to processing image data received from image sensor 713, whose optical axis 723 may be aligned with the direction of sound wave 905, and give a lower priority to processing image data received from image sensor 711, whose field of view 741 may not include the direction of sound wave 905.

In some embodiments, image sensors 711, 712, and 713 may be initially turned on, and may be capturing image data of the environment of user 100, but may not be focusing on a particular object, such as second person 902. In some embodiments, image sensors 711, 712, and 713 may be turned on but may not be transmitting the captured image data to image database 601 for storage and for further analysis by the processing device. After identifying the direction of sound wave 905 received by directional microphone 900 and determining that the fields of view associated with image sensors 712 and 713 include the direction, the processing device may adjust image sensors 712 and 713 such that they capture image data including second person 902 who uttered the voice 905 and transmit the image data to image database 601 for storage and for further analysis by the processing device.

In some embodiments, one or more image sensors 711, 712, and 713 may capture image data of the environment of user 100 shown in FIG. 9. The processing device may analyze the image data captured by the one or more of image sensors 711, 712, and 713 to identify a visual trigger, such as detecting a face of second person 902. The processing device may then cause at least two of the image sensors 711, 712, and 713 to operate simultaneously. For example, the processing device may select image sensors 712 and 713, and cause them to operate simultaneously to capture image data including second person 902 within their fields of view. The processing device may analyze the image data captured by image sensors 712 and 713 to extract information regarding second person 902, such as, the age and gender of second person 902, a facial expression and/or gesture made by second person 902, the clothes second person 902 is wearing, the actions second person 902 is performing, etc. The processing device may provide such information to user 100 through text, audio, and/or video message output through feedback outputting unit 230, or computing device 120.

In some embodiments, the image data captured by image sensors 712 and 713 regarding second person 902 may have low resolutions (e.g., 1.0 Megapixels, 1.5 Megapixels, etc.). The processing device may combine or aggregate the low resolution image data to generate image data of a higher resolution than an individual resolution of each image sensor 712 or 713. The higher resolution image data may provide greater details about second person 902. Thus, the processing device may extract more accurate information regarding second person 902 from the higher resolution image data.

Figure 10:
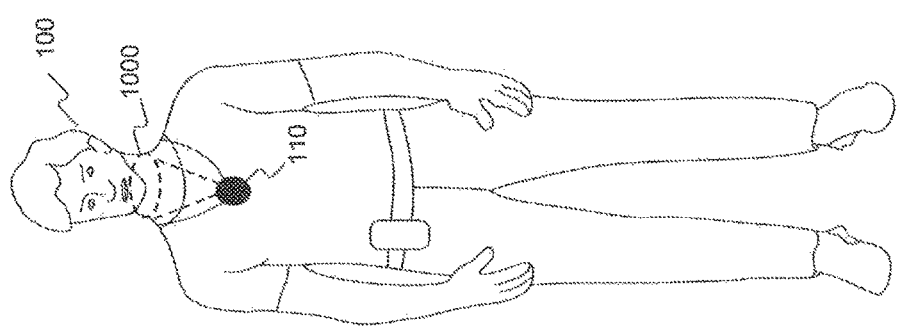
FIG. 10 is a schematic illustration of an example of the user wearing a wearable apparatus according to a disclosed embodiment.

FIG. 10 is a schematic illustration of an example of user 100 wearing wearable apparatus 110 according to a disclosed embodiment. At least one of image sensors 711, 712, and 713 may capture image data of user 100, such as, for example, a portion of the head of user 100, including a chin 1000. The processing device may analyze the image data to identify chin 1000 of user 100. In some embodiments, the processing device may analyze a plurality of sequentially acquired image data to detect that chin 1000 is moving, indicating that user 100 may be speaking. The processing device may determine that user 100 is likely speaking with someone, such as second person 902 (e.g., based on images acquired of person 902). Based on detecting the movement of chin 1000, the processing device may activate at least one additional image sensor to capture image data of a portion of the environment in front of user 100. In some embodiment, based on detecting the movement of chin 1000, the processing device may activate microphone 900 included in wearable apparatus 110 (as shown in FIG. 9) to detect or receive a voice from person 902 who is speaking with user 100. As discussed above in connection with FIG. 9, the processing device may analyze the sound wave received by microphone 900, and identify a direction of the sound wave. Based on the identified direction, the processing device may select one or more additional image sensors (such as sensor 712 and/or 713) and cause them to operate simultaneously to capture image data in the identified direction, as discussed above in connection with FIG. 9. The one or more additional image sensors may be selected based on the identified direction of the sound and their optical axes and/or fields of view. For example, the processing device may select and activate image sensor 713 that has an optical axis proximate the direction of sound. By activating microphone 900 based on detection of a moving chin 1000, microphone 900 may be maintained in an idle state (e.g., microphone 900 is powered off) prior to detection of the moving chin to save energy.

In some embodiments, the processing device may analyze an image including chin 1000 of user 100, and determine or estimate a turning direction of chin 1000 with respect to the direction the chest of user 100 is facing, or with respect to a horizontal direction, such as horizontal direction 910 shown in FIG. 9. The turning direction may be estimated, for example, about 10° to the left of user 100, or about 15° to the right of user 100. Based on the estimated turning direction of chin 1000, the processing device may select one or more image sensors that have optical axes at least pointing to that turning direction or approximate to that turning direction (e.g., within 1°, 2°, 30°, etc.).

In some embodiments, the processing device may determine which image sensor to activate for capturing image data based on a combination of the estimated turning direction of chin 1000 and the estimated direction of sound 905. For example, if the estimated turning direction of chin 1000 is different from the estimated direction of sound 905, the processing device may activate both image sensors having optical axes pointing to (or approximate to) the estimated turning direction and image sensors having optical axes pointing (or approximate to) to the estimated direction of sound 905.

In some embodiments, the processing device may determine that second person 902 is speaking based on one or a combination of a determined orientation of the second person 902 relative to first person 901 (e.g., second person 902 appearing in captured image data as facing first person 901), a determination from captured image data that the mouth of second person 902 is opening and closing, and detection of speech by microphone 900.

Figure 11:
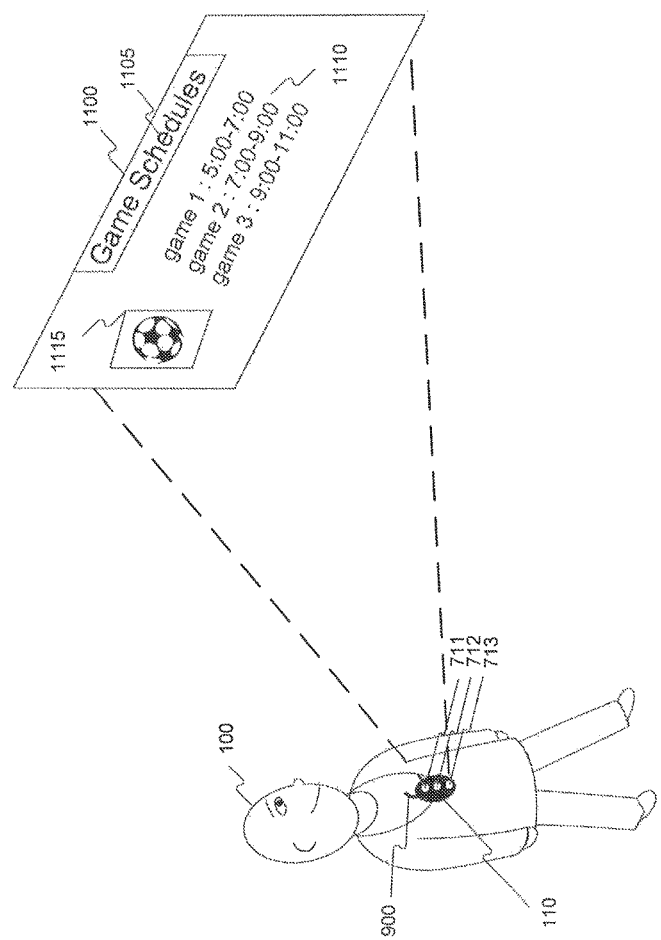
FIG. 11 shows an example environment including a wearable apparatus for capturing image data according to a disclosed embodiment.

FIG. 11 shows an example environment including wearable apparatus 110 for capturing image data. One or more image sensors 711, 712, and 713 (e.g., image sensor 713) may capture image data of an environment of user 100, which may include an advertisement board 1100, as shown in FIG. 11. The advertisement board 1100 may include first text 1105 "Game Schedules," second text 1110 listing detailed game schedules, and a logo 1115, which may be, for example, a team logo (e.g., a soccer team logo). The processing device may analyze the image data captured by image sensor 713 to identify a visual trigger. The visual trigger may include one or more of detection of text and detection of a logo.

In the example shown in FIG. 11, the processing device may identify first and second text 1105 and 1110, and logo 1115. The processing device may determine, based on the identified text and logo that the advertisement board 1100 shows game schedules for a soccer game team. The processing device may cause at least two of image sensors 711, 712, and 713 to operate simultaneously. For example, the processing device may cause image sensors 711 and 712 to operate simultaneously to capture image data of advertisement board 1100 with better focuses. The processing device may combine or aggregate the image data captured by image sensors 711 and 712 to generate image data of a higher resolution than the individual resolution of each of image sensors 711 and 712. Other information included in advertisement board 1100 (e.g., other texts, graphics, or logos), which may not be included in the initial image data captured by image sensor 713, may be extracted from the higher resolution image data. The processing device may provide extracted information to user 100 through a text, audio, and/or video message output through feedback outputting unit 230, or computing device 120.

Figure 12:
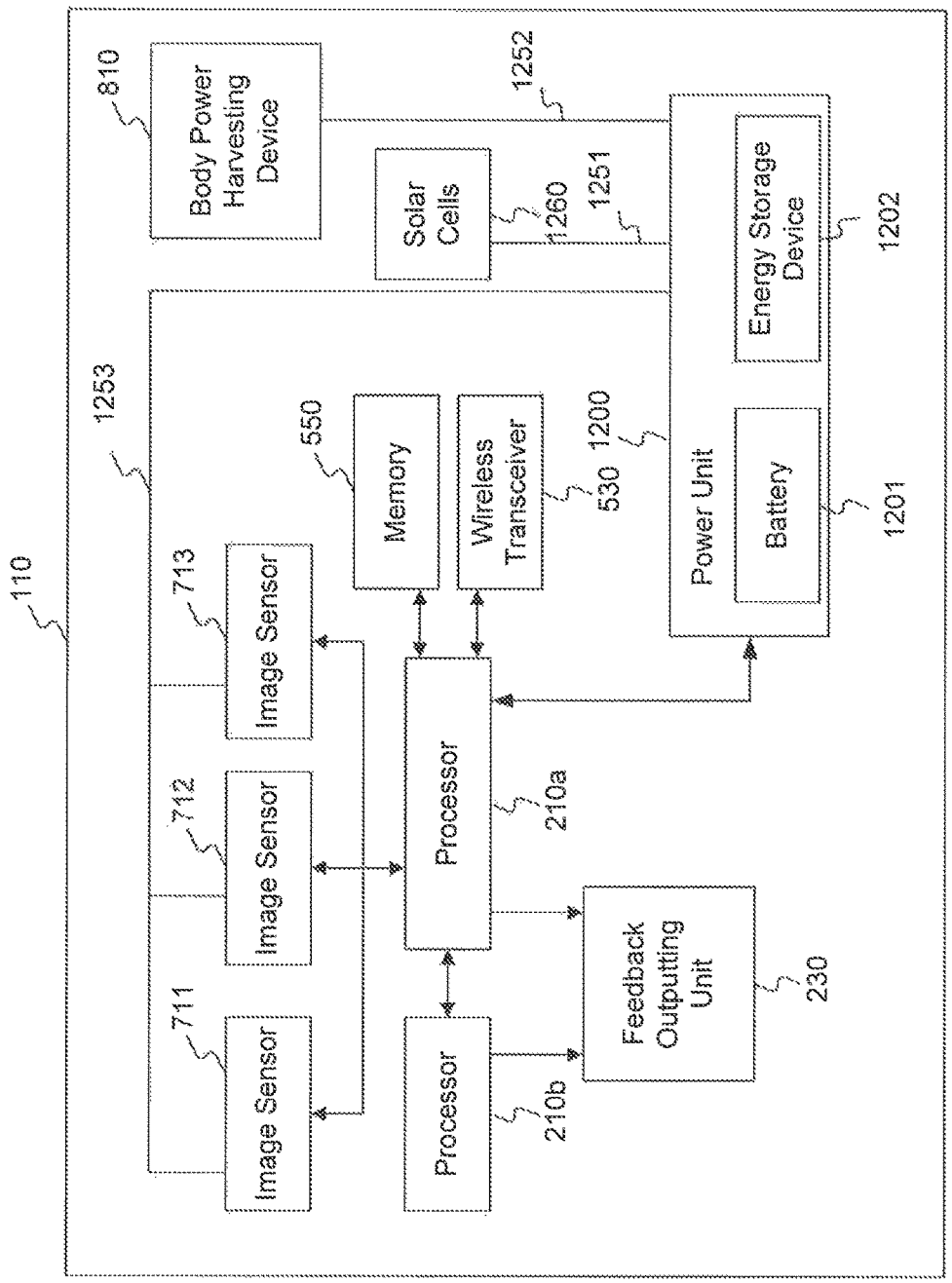
FIG. 12 is a block diagram illustrating an example of the components of a wearable apparatus according to a disclosed embodiment.

FIG. 12 is a block diagram illustrating an example of the components of a wearable apparatus according to a disclosed embodiment. As shown in FIG. 12, wearable apparatus 110 may include components similar to those depicted in FIGS. 5A, 5B, and 5C. Although not all of the components of wearable apparatus 110 shown in FIGS. 5A, 5B, and 5C are shown in FIG. 12, it is understood that wearable apparatus 110 shown in FIG. 12 may include any components of wearable apparatus 110 shown in FIGS. 5A, 5B, and 5C. Similarly, any components of wearable apparatus 110 shown in FIG. 12 may be included in any embodiment of wearable apparatus 110 shown in FIGS. 5A, 5B, and 5C. Descriptions of processor 210a and 210b, feedback outputting unit 230, memory 550, and wireless transceiver 530 are similar to those provide above, and thus are not repeated. As shown in FIG. 12, wearable apparatus includes a plurality of image sensors, such as, three image sensors 711, 712, and 713. Additional or fewer image sensors may also be included.

Components or features of wearable apparatus 110 shown in different examples in FIGS. 7-9 may be used together in any combination in wearable apparatus 110. For example, solar cells 761 and 762 and power unit 770 shown in FIG. 7 may be used in combination with body power harvesting device 810 shown in FIG. 8 (in such a combination, power unit 770 may be combined with power unit 800 or may be separately provided). As another example, solar cells 761 and 762 and power unit 770 shown in FIG. 7 may be used in combination with body power harvesting device 810 shown in FIG. 8, and microphone 900 shown in FIG. 9.

As shown in FIG. 12, wearable apparatus 110 may include a power unit 1200, which may be power unit 770 and/or power unit 800. Power unit 1200 may include a battery 1201, which may be similar to battery 771 and battery 805. Additionally or alternatively, power unit 1200 may include an energy storage device 1202. Energy storage device 1202 may or may not be a battery. For example, energy storage device 1202 may be a capacitor. Wearable apparatus 110 may include solar cells 1200, which may include solar cells 761 and 762. Wearable apparatus 110 may include body power harvesting device 810. Solar cells 1260 and body power harvesting device 810 may be electrically connected with power unit 1200 through, for example, wires 1251 and 1252. Power unit 1200 may be electrically connected with image sensors 711, 712, and 713 through, for example, a wire 1253.

Figure 13:
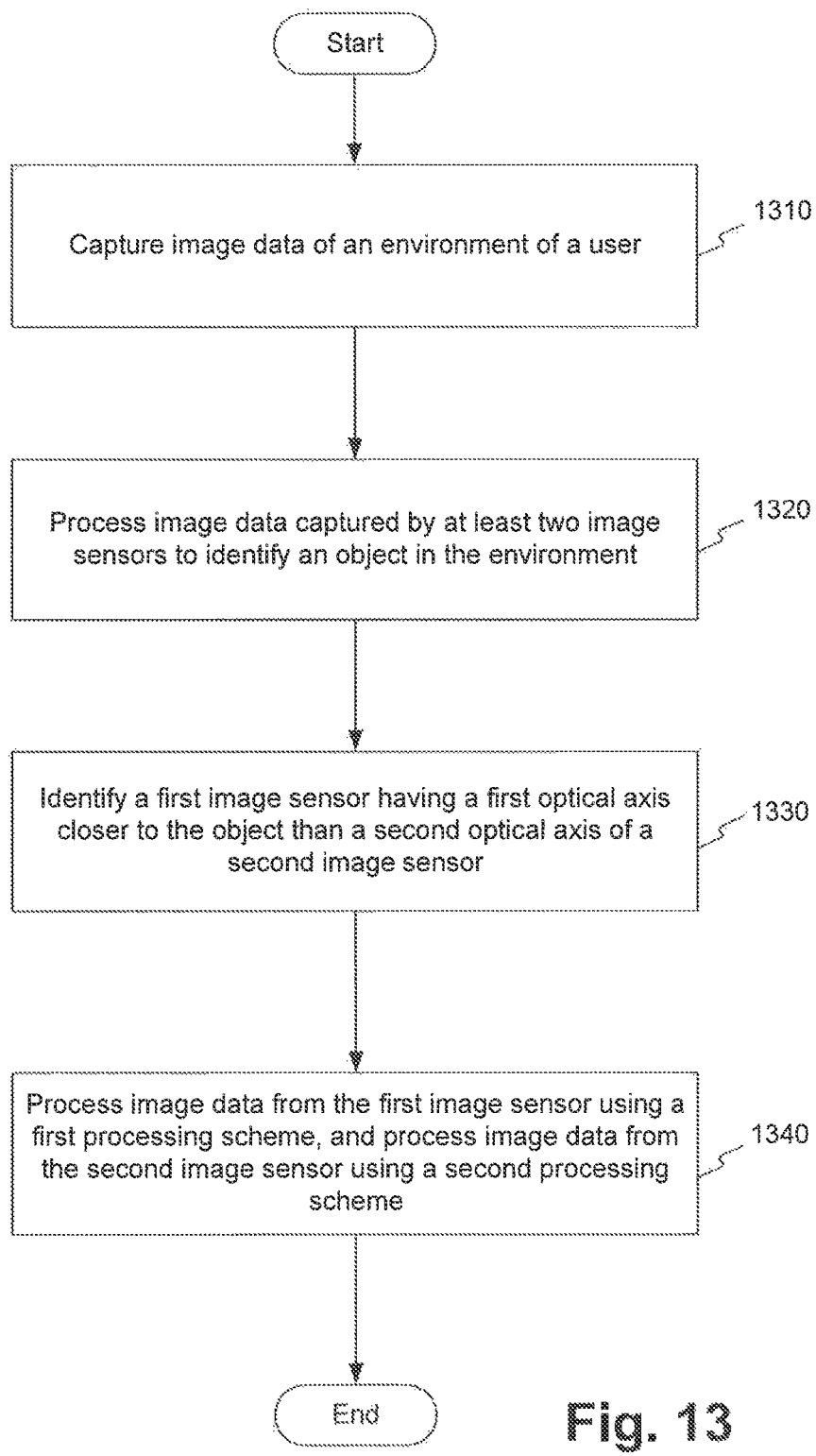
FIG. 13 is a flowchart showing an example method for capturing and processing image data according to a disclosed embodiment.

FIG. 13 is a flowchart showing an example method 1300 for capturing and processing image data according to a disclosed embodiment. Method 1300 may be executed by various devices included in wearable apparatus 110, such as image sensor 220, 220a, and/or 220b, and at least one processing device (e.g., processor 210 and/or processor 540). Method 1300 may include capturing image data of an environment of a user (e.g., user 100) who wears wearable apparatus 110 (step 1310). For example, one or more image sensors 711, 712, and 713 may capture image data of the environment of user 100, as shown in FIGS. 9-11. Method 1300 may include processing image data captured by at least two image sensors to identify an object in the environment (step 1320). For example, the processing device may process image data captured by image sensors 711 and 713 to identify second person 902.

Method 1300 may include identifying a first image sensor from among the at least two image sensors, the first image sensor having a first optical axis closer to the object than a second optical axis of a second image sensor from among the at least two image sensors (step 1330). For example, the processing device may compare the position of second person 902 appearing in the images respectively captured by image sensors 711 and 713, and determine whether second person 902 is closer to optical axis 721 associated with image sensor 711, or is closer to optical axis 723 associated with image sensor 713. In the example shown in FIG. 9, the processing device may determine that second person 902 is closer to optical axis 723 associated with image sensor 713 than optical axis 721 associated with image sensor 711.

After identifying the first image sensor (e.g., image sensor 713), method 1300 may also include processing image data from the first image sensor using a first processing scheme, and processing image data from the second image sensor (step 1340). A processing scheme refers to one or more settings, parameters, and steps for processing image data. For example, the first processing scheme may be continuing to process image data received from an image sensor. The second processing scheme may be discontinuing the processing of image data received from an image sensor. The first and second processing schemes may include one or more of an image resolution, a shutter speed, an aperture, a time period to capture images and/or video before discontinuing capturing images and/or video, etc. The first and second processing schemes may also include settings related to image processing, such as one or more of desired image sizes, image processing speed, compression ratios, color adjustment, etc. For example, in the example shown in FIG. 9, after identifying that image sensor 713, which has optical axis 723 closer to the object, i.e., second person 902, than optical axis 721 of image sensor 711, the processing device may determine continue to process the image data from image sensor 713, and discontinue processing image data from image sensor 711.

In some embodiments, the processing device may determine which image sensor has captured image data including the identified object (e.g., second person 902), and may continue processing image data from the image sensor that has captured image data including the identified object, and discontinue processing image data from other image sensors that have not captured image data including the identified object. For example, if the processing device identifies that image sensor 713 has captured image data of second person 902, and image sensor 711 has not captured image data of second person 902, the processing device may continue to process image data captured by image sensor 713, and discontinue processing of image data captured by image sensor 711.

In some embodiments, the processing device may also determine which image sensor has an optical axis proximate to second person 902, and which image sensor has an optical axis distal from second person 902. For example, the processing device may determine that image sensor 713 has an optical axis proximate to second person 902, and image sensor 711 has an optical axis distal from second person 902. The processing device may continue to process image data captured by image sensor 713 that has an optical axis proximate to second person 902, and may discontinue processing image data captured by image sensor 711 that has an optical axis distal from second person 902.

In some embodiments, the processing device may determine which optical axis of the image sensors is closer to the object. For example, the processing device may determine that the optical axis of image sensor 713 is closer to second person 902 than the optical axis of image sensor 711. The processing device may continue processing image data captured by image sensor 713, and discontinue processing image data captured by image sensor 711. In some embodiments, the processing device may continue processing image data captured by a first image sensor (e.g., the image sensor having an optical axis closest to an object) and discontinue processing image data captured by a plurality of other image sensors (e.g., image sensors having optical axes farther from the object as compared to the first image sensor).

Method 1300 may further include other steps and processes not shown in the flowchart of FIG. 13. For example, method 1300 may further include resuming processing image data captured from the second image sensor after a predetermined time period has elapsed. After discontinuing processing of image data captured by image sensor 711, the processing device may determine whether a predetermined time period, such as, for example, 1 minute, 10 minutes, 1 hour, etc., has elapsed. If the predetermined time period has elapsed, the processing device may resume processing of image data captured by image sensor 711.

In some embodiments, method 1300 may further include discontinuing processing of image data from the first image sensor when the object is no longer in the field of view of the first image sensor, when the object is distal from the optical axis of the first image sensor, or when the object is no longer closer to the optical axis of the first image sensor than to the optical axis of the second image sensor. For example, as discussed above in step 1330, image sensor 713 was identified as having captured image data of second person 902, having an optical axis proximate second person 902, or having an optical axis closer to second person 902 than the optical axis of image sensor 711, and the processing device continued to process image data captured by image sensor 713. If the processing device detects, from image data captured by image sensor 713, that second person 902 is no longer in the field of view of image sensor 713, is distal from the optical axis of image sensor 713, or is no longer closer to second person 902 than the optical axis of image sensor 711, the processing device may discontinue processing of the image data from the image sensor 713.

In some embodiments, method 1300 may further include causing the second image sensor to discontinue capturing image data for at least a portion of a time period during which image data from the first image sensor is being processed. For example, as discussed above, at step 1340, the processing device discontinued processing of the image data from image sensor 711. The processing device may further cause image sensor 711 to discontinue capturing image data for at least a portion of a time period during which image data from image sensor 713 is being processed. The image data from image sensor 713 may be processed for a time period of 30 minutes, and the processing device may cause image sensor 711 to discontinue capturing image data for at least the first 15 minutes of the 30-minute time period.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable apparatus for capturing image data from a plurality of fields of view, the wearable apparatus comprising:
   a plurality of image sensors for capturing image data of an environment of a user, wherein each of the image sensors is associated with a different field of view of the user;
   and
   at least one processor programmed to:
      process image data captured by at least two of the image sensors to identify an object in the environment of the user;
      compare a first position of the object appearing in a first image from a first image sensor of the at least two image sensors and a second position of the object appearing in a second image from a second image sensor of the at least one images sensors, the first image and the second image being captured at a first time;
      determine, based on the comparison, which image sensor has an optical axis closer to the object, thereby identifying the first image sensor has a first optical axis that is closer to the object than a second optical axis of the second image sensor; and
      after identifying the first image sensor, continue to process image data from the first image sensor, and discontinue processing image data from the second image sensor.

2. The wearable apparatus of claim 1, wherein the first and second optical axes associated with the first and second image sensors are oriented in different directions.

3. The wearable apparatus of claim 1, wherein the first and second optical axes associated with the first and second image sensors are divergent.

4. The wearable apparatus of claim 1, wherein an angle between two or more optical axes associated with the image sensors is greater than 20°.

5. The wearable apparatus of claim 1, wherein an angle between two or more optical axes associated with the image sensors is less than 90°.

6. The wearable apparatus of claim 1, wherein a combined angle of the fields of view of the image sensors is more than 100°.

7. The wearable apparatus of claim 1, wherein at least some of the fields of view of the image sensors overlap.

8. The wearable apparatus of claim 1, wherein at least some of the fields of view of the image sensors do not overlap.

9. The wearable apparatus of claim 1, wherein the at least one processor is further programmed to resume processing the image data captured by the second image sensor after a predetermined time period has elapsed.

10. The wearable apparatus of claim 1, wherein the at least one processor is further programmed to discontinue processing image data from the first image sensor when the object is no longer in the field of view of the first image sensor.

11. The wearable apparatus of claim 1, wherein the at least one processor is further programmed to cause the second image sensor to discontinue capturing image data for at least a portion of a time period during which image data from the first image sensor is being processed.

12. The wearable apparatus of claim 1, wherein the at least one processor is further programmed to combine image data captured by at least two of the image sensors to create an image having a higher resolution than an individual resolution of any of the image sensors.

13. The wearable apparatus of claim 11, wherein the image sensors are each configured to provide an image resolution less than 1.5 Megapixels.

14. The wearable apparatus of claim 1, wherein, in response to a visual trigger identified in at least one image captured by at least one of the image sensors, the processor is further programmed to cause at least two of the image sensors to operate simultaneously.

15. The wearable apparatus of claim 14, wherein the visual trigger includes one or more of detection of text, detection of a face, and detection of a logo.

16. The wearable apparatus of claim 1, further comprising at least one solar cell configured to provide power to at least one of image sensors.

17. The wearable apparatus of claim 16, wherein the at least one solar cell is included in a capturing unit that includes the image sensors.

18. The wearable apparatus of claim 17, wherein the image sensors are associated with corresponding lenses located on the capturing unit, and the capturing unit includes a plurality of solar cells interspersed between the lenses.

19. The wearable apparatus of claim 16, further comprising a battery for storing at least some energy generated by the at least one solar cell.

20. The wearable apparatus of claim 1, further comprising a battery configured to store energy derived from movements of the user.

21. The wearable apparatus of claim 20, wherein the stored energy is used to power at least one of the image sensors.

22. The wearable apparatus of claim 1, wherein the at least one processor is further programmed to identify a chin of the user in at least one image captured by at least one of the image sensors.

23. The wearable apparatus of claim 1, further comprising a microphone, wherein the at least one processor is further programmed to identify a direction of sound received by the microphone.

24. The wearable apparatus of claim 23, wherein the at least one processor is further programmed to select one of the image sensors to capture image data based on the direction of the sound received by the microphone.

25. The wearable apparatus of claim 1, further comprising a microphone, wherein the at least one processor is further programmed to select at least one of the image sensors to capture image data based on sound captured by the microphone.

26. A method for capturing image data from a wearable device, the method comprising:
  processing, by at least one processor included in the wearable device, image data captured by at least two image sensors included in the wearable device to identify an object in an environment of the user, wherein each of the image sensors includes a different field of view of the user;
  comparing a first position of the object appearing in a first image from a first image sensor of the at least two image sensors and a second position of the object appearing in a second image from a second image sensor of the at least one images sensors, the first image and the second image being captured at a first time;
  determining, by the at least one processor and based on the comparison, which image sensor has an optical axis closer to the object, thereby identifying the first image sensor has a first optical axis that is closer to the object than a second optical axis of the second image sensor; and
  after identifying the first image sensor, continuing to process, by the at least one processor, image data from the first image sensor, and discontinuing processing image data from the second image sensor.

27. A software product stored on a non-transitory computer readable medium and comprising data and computer implementable instructions for carrying out the method of claim 26.

* * * * *